US008473636B2

(12) United States Patent  
Kodama

(10) Patent No.: US 8,473,636 B2
(45) Date of Patent: Jun. 25, 2013

(54) INFORMATION PROCESSING SYSTEM AND DATA MANAGEMENT METHOD

(75) Inventor: Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1037 days.

(21) Appl. No.: 12/068,320

(22) Filed: Feb. 5, 2008

(65) Prior Publication Data

US 2009/0119395 A1 May 7, 2009

(30) Foreign Application Priority Data

Nov. 1, 2007 (JP) ................................ 2007-285524

(51) Int. Cl.
*G06F 15/16* (2006.01)
*G06F 12/00* (2006.01)

(52) U.S. Cl.
USPC ............................ 709/246; 709/230; 707/821

(58) Field of Classification Search
USPC ........................................................ 709/246
See application file for complete search history.

(56) References Cited

U.S. PATENT DOCUMENTS

| 2002/0161855 | A1  | 10/2002 | Manczak et al. |         |
|--------------|-----|---------|----------------|---------|
| 2003/0225755 | A1* | 12/2003 | Iwayama et al. | 707/3   |
| 2005/0086192 | A1* | 4/2005  | Kodama         | 707/1   |
| 2005/0086294 | A1* | 4/2005  | Kodama         | 709/203 |
| 2005/0210083 | A1* | 9/2005  | Kodama         | 707/205 |
| 2007/0174354 | A1* | 7/2007  | Kodama et al.  | 707/202 |

FOREIGN PATENT DOCUMENTS

JP       2005-530280 A    10/2005

OTHER PUBLICATIONS

Ruemer, R.; Miesenberger, K.; , "Using XML for Publishing on Demand in Different Output Formats," Automated Production of Cross Media Content for Multi-Channel Distribution, 2006. AXMEDIS '06. Second International Conference on , vol., No., pp. 153-156, Dec. 13-15, 2006.*
Shu Xu; Wei-Jen Lee; , "Common Data Format for the Power System Simulattion Programs," Power Symposium, 2007. NAPS '07. 39th North American , vol., No., pp. 130-135, Sep. 30, 2007-Oct. 2, 2007.*
"Fast ESP", FAST—Solutions —Platforms, http://www.fastsearch.com/thesolution.aspx?m=376, 2 pages.
Reagan W. Moore, "Storage Resource Broker Overview", UCSD, http://www.sdsc.edu/srb, 17 pages.
"ONStor Global Namespace", ONStor GNS, http://www.onstor.com/global_namespace.pho, 2 pages.
"Extensible Markup Language (XML) 1.1 (Second Edition)", Web Service Technology, http://www.w3.org/TR/xml11/, 78 pages.
"Web Services Architecture", http://www.w3.org/TR/ws-arch/, 131 pages.
"Gmail Filesystem-GMailFS", http://richard.jones.name/google-jacks/gmail-filesystem/gmail-filesystem.html, 3 pages.

* cited by examiner

*Primary Examiner* — Jeffrey R Swearingen
*Assistant Examiner* — Taylor Elfervig
(74) *Attorney, Agent, or Firm* — Volpe and Koenig, P.C.

(57) ABSTRACT

The server device includes: an allocation unit for allocating a unique identifier to each of first data and second data; a management unit for managing a correspondence between the identifier and a method for accessing the first data or second data identified by the identifier; a presentation unit for presenting the identifier managed by the management unit to the client device; a conversion unit for converting an identifier-specifying request for access to the first data or second data from the client device into a method for accessing the first data or second data corresponding to the identifier using an access method associated by the management unit with the identifier; and a data access unit for requesting access to the first data or second data using the access method converted to by the conversion unit, and sending an access result to the client device.

11 Claims, 22 Drawing Sheets

FIG.5

| VIRTUAL IDENTIFIER | ORIGINAL STORAGE POSITION ||||  ORIGINAL UPDATE TIME | ACCOUNT INFORMATION | NUMBER OF COPIES | UPDATED DATA STORAGE POSITION |
|---|---|---|---|---|---|---|---|---|
| | IP ADDRESS | APPLICATION TYPE | IDENTIFIER IN APPLICATION DEVICE | | | | | |
| 001 | 1.1.1.2 | MAIL | OBJ001 | 07/6/1 1:00 | | 5 | STR3/fileA |
| 002 | 1.1.1.2 | MAIL | OBJ002 | 07/6/2 1:00 | | 2 | |
| 003 | 1.1.1.3 | Web | obj003.html | 07/6/3 1:00 | | 1 | STR3/fileC |
| 004 | 1.1.1.4 | NAS | file004 | 07/6/4 1:00 | | 2 | |
| ... | ... | ... | ... | ... | ... | ... | ... |

26A — VIRTUAL IDENTIFIER
26B — IP ADDRESS
26G — (col marker)
26H — APPLICATION TYPE
26I — IDENTIFIER IN APPLICATION DEVICE
26C — ORIGINAL UPDATE TIME
26D — ACCOUNT INFORMATION
26E — NUMBER OF COPIES
26F — UPDATED DATA STORAGE POSITION

FIG.6

| IP ADDRESS | APPLICATION TYPE | ACCOUNT INFORMATION LIST | UPDATABLE/ NON-UPDATABLE | CONVERSION PROGRAM INFORMATION |
|---|---|---|---|---|
| 1.1.1.2 | MAIL | | NOT UPDATABLE | Prog1 |
| 1.1.1.3 | Web | | NOT UPDATABLE | Prog2 |
| 1.1.1.4 | NAS | | UPDATABLE | Prog3 |
| ⋮ | ⋮ | ⋮ | ⋮ | ⋮ |

| | APPLICATION TYPE | IMAP4 | NFS | |
|---|---|---|---|---|
| DATA CORRESPONDENCE RELATIONSHIP (61C) | APPLICATION TYPE | IMAP4 | NFS | 61E |
| | DATA UNIT | MESSAGE | FILE | 61F |
| | DATA NAME | SUBJECT NAME | FILE NAME | 61G |
| | DATA IDENTIFIER | UID | PASS NAME | 61H |
| | ATTRIBUTE INFORMATION | MESSAGE SIZE | FILE SIZE TIME OF CREATION LAST ACCESS TIME TAG INFORMATION ARBITRARY ATTRIBUTE INFORMATION (SONG TITLE, SINGER NAME, ETC.) | 61I |
| | APPLICATION EXTENSION INFORMATION | UNREAD FLAG RETURNED FLAG RECEIPT TIME | | 61J |
| | USER NAME | ACCOUNT NAME | UID | 61K |
| | PASSWORD | TEXT | TEXT | 61L |
| | ACCESS RIGHT | ONLY USER CAN ACCESS ALL DATA | READ/WRITE/ DELETE COMMAND FOR EACH USER | 61M |
| COMMAND CORRESPONDENCE RELATIONSHIP (61D) | LOGIN | LOGIN | NONE | 61N |
| | LISTING | SEARCH | LOOKUP | 61O |
| | ATTRIBUTE REFERENCE | STORE | GETATTR | 61P |
| | ATTRIBUTE UPDATE | NOT UPDATABLE | SETATTR | 61Q |
| | CREATION | APPEND | CREATE | 61R |
| | READ | FETCH | READ | 61S |
| | WRITE | NOT UPDATABLE | WRITE | 61T |
| | DELETE | EXPUNGE | REMOVE | 61U |

| | 28A | 28B | 28C |
|---|---|---|---|
| | IP ADDRESS | APPLICATION TYPE | USED LUN |
| | 1.1.1.2 | MAIL | LU002 |
| | 1.1.1.3 | Web | LU003 |
| | 1.1.1.4 | NAS | LU004 |
| | ⋮ | ⋮ | ⋮ |

| 29A | 29B | 29C | 29D | 29E |
|---|---|---|---|---|
| IP ADDRESS | DATA MANAGEMENT SOFTWARE TYPE | DATA-RELATED INFORMATION ACQUISITION METHOD | COPY SOURCE LUN | COPY DESTINATION LUN |
| 1.1.1.5 | STORAGE CONTROL PROGRAM | STORAGE CONTROL PROGRAM | LU002 | LU005 |
| | | | LU004 | LU006 |
| 1.1.1.6 | BACKUP MANAGEMENT SOFTWARE | BACKUP MANAGEMENT CLI | LU003 | |
| ⋮ | ⋮ | ⋮ | ⋮ | ⋮ |

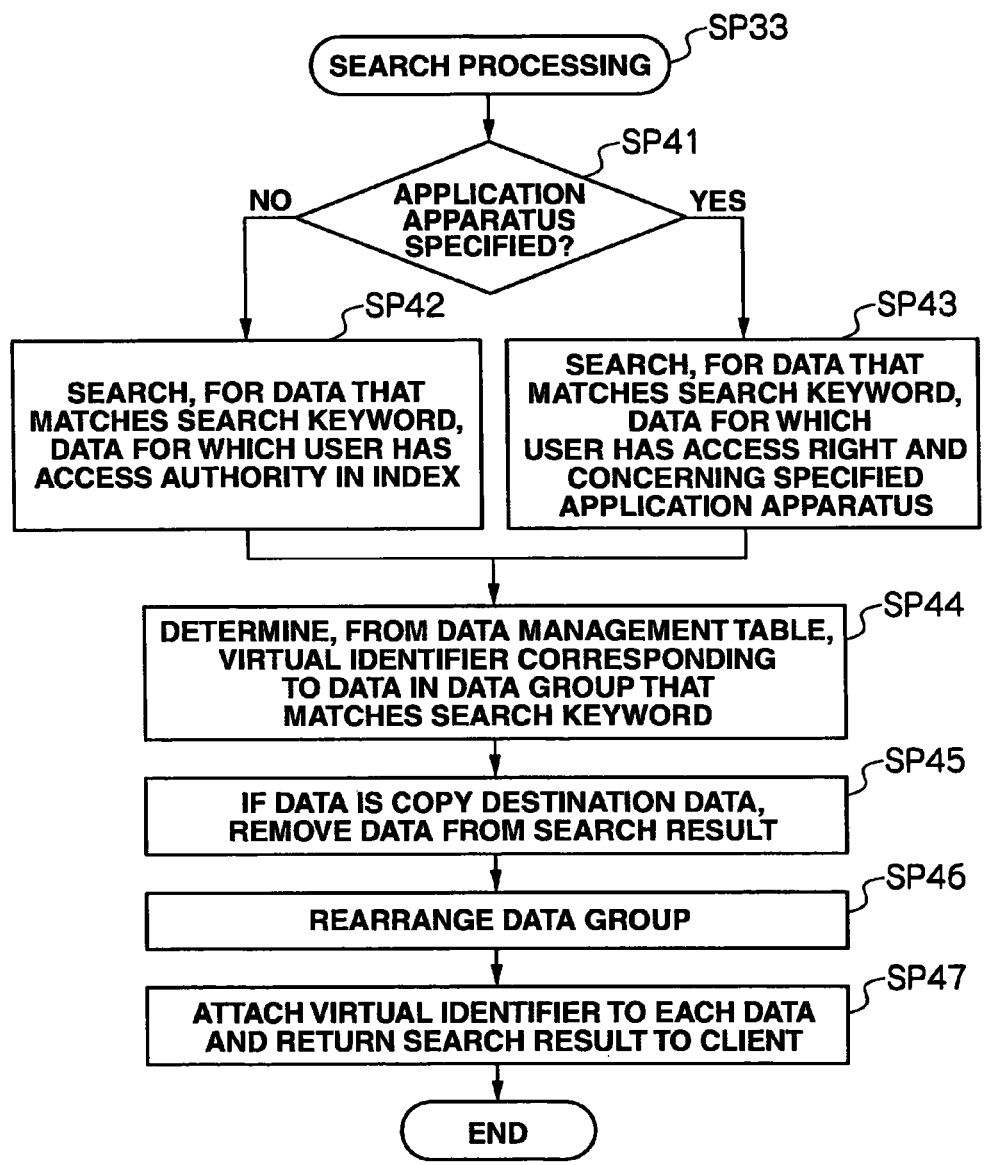

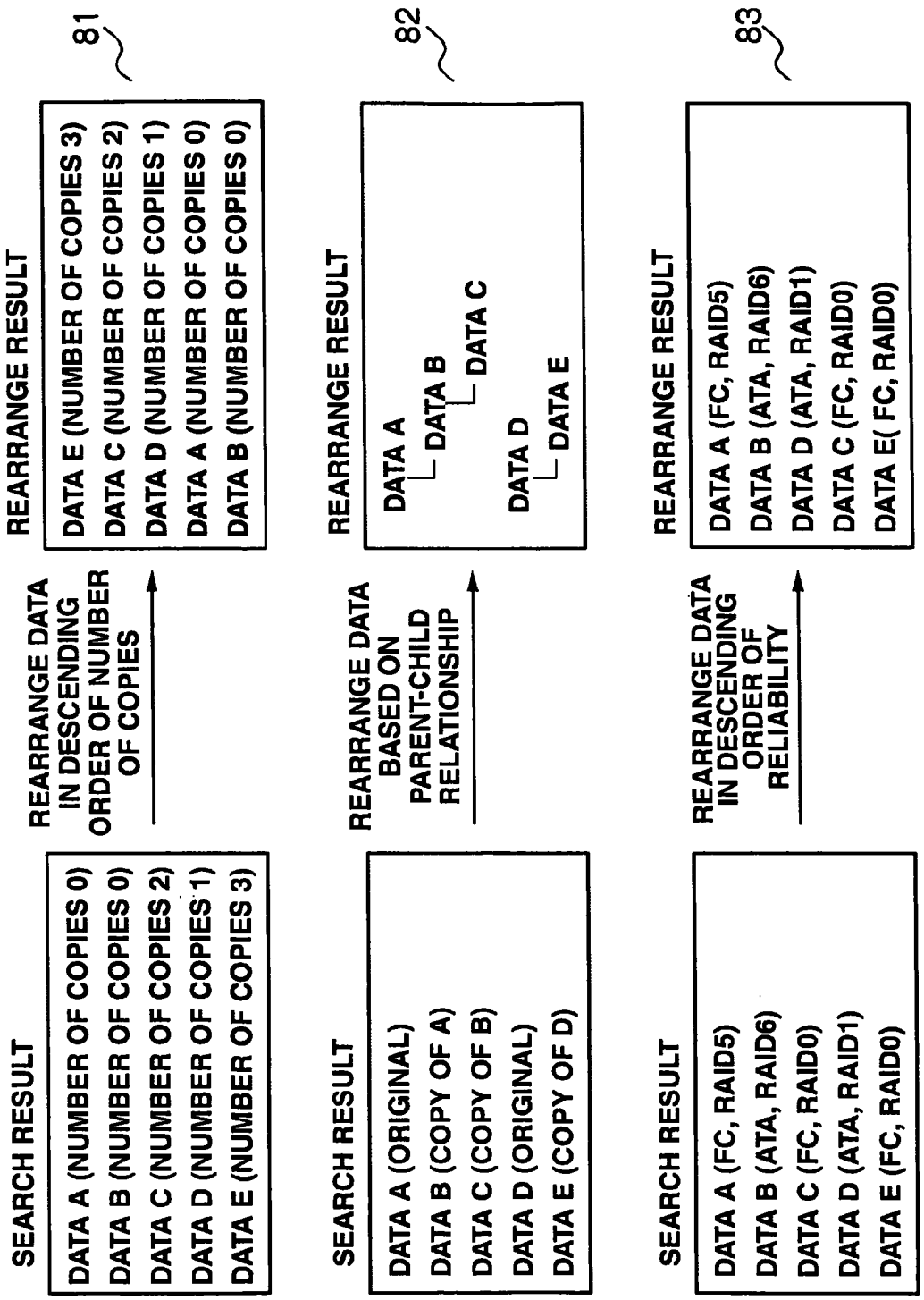

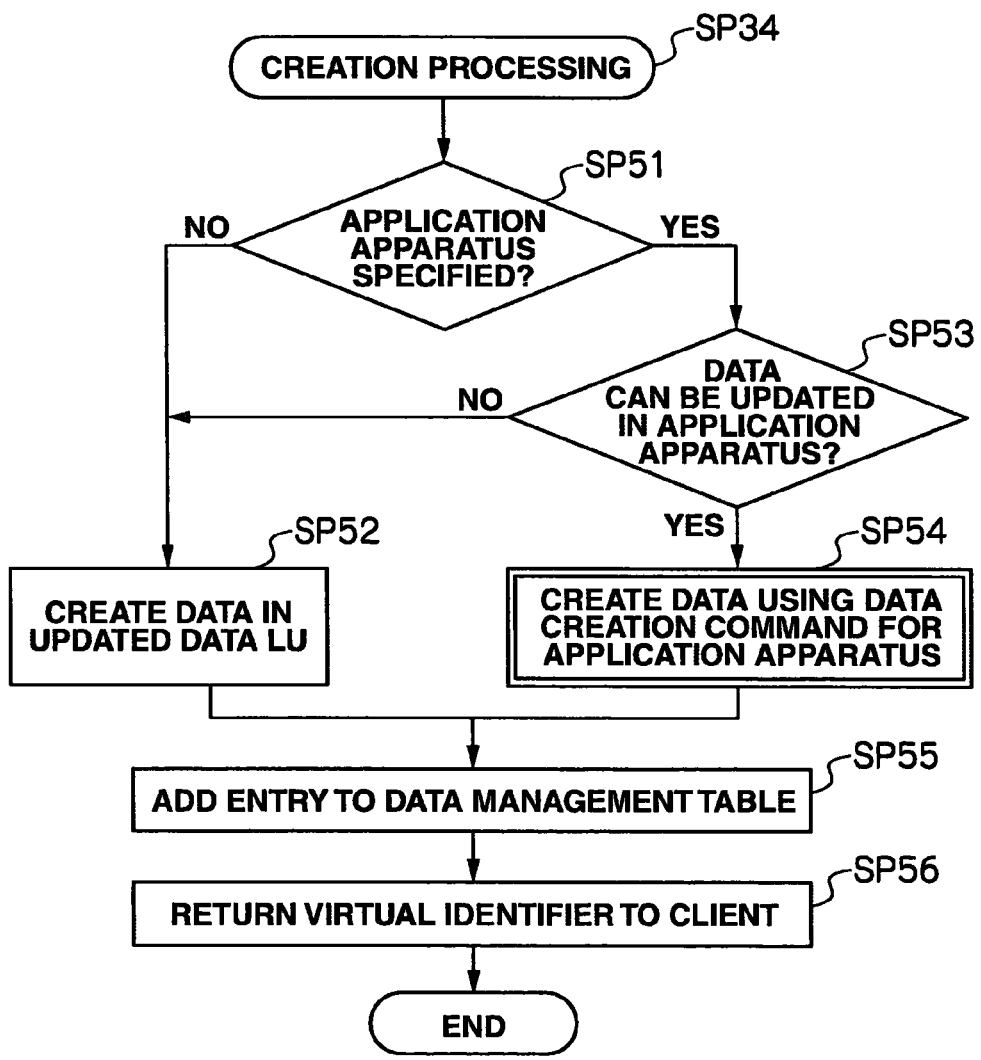

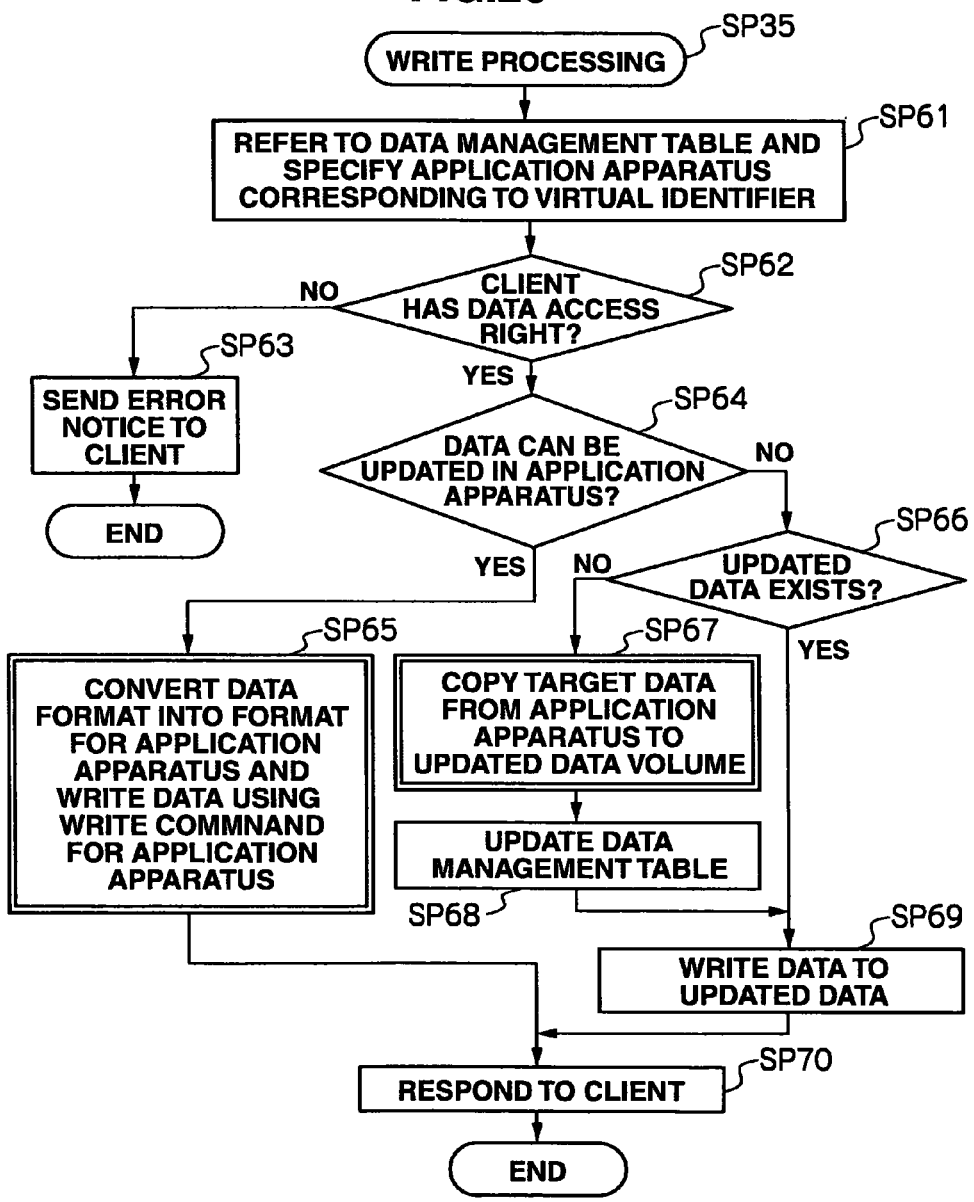

| VIRTUAL IDENTIFIER | 001 | ~74A |
| OFFSET | 10 | ~74B |
| DATA LENGTH | 5 | ~74C |

74

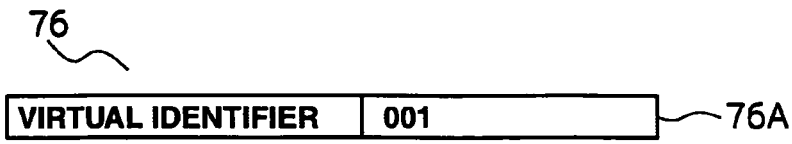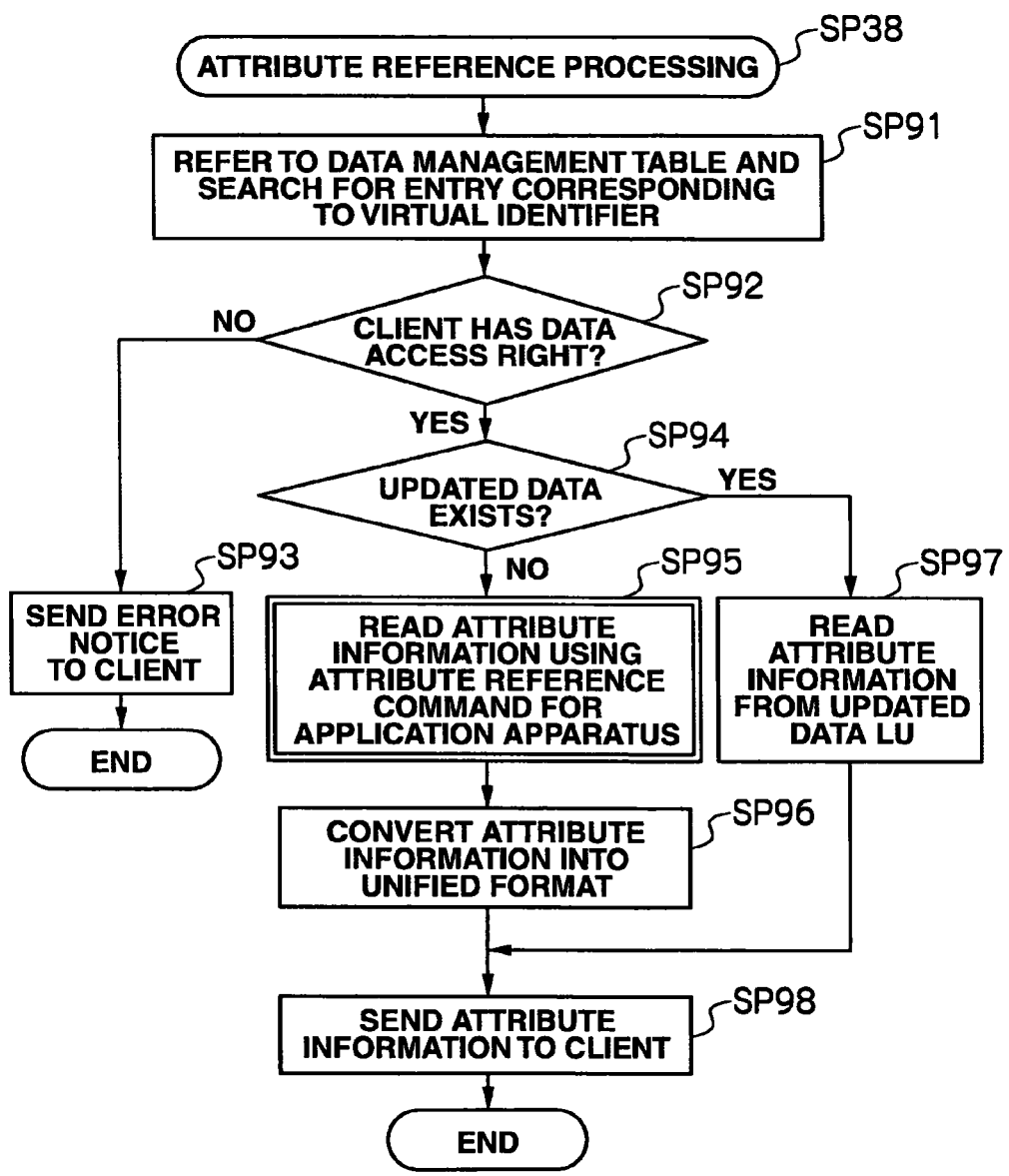

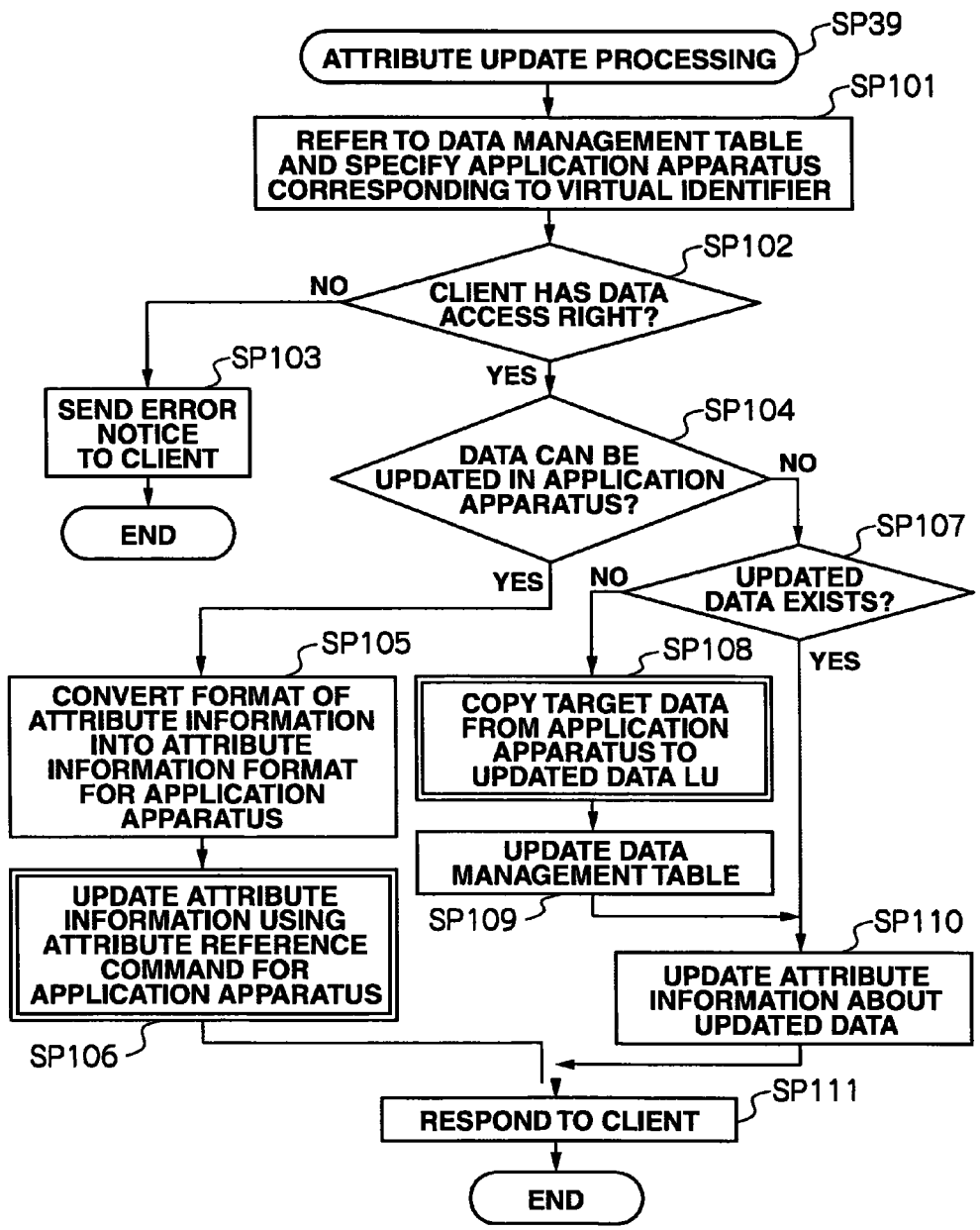

FIG.30

| VIRTUAL IDENTIFIER | ORIGINAL STORAGE POSITION ||| ORIGINAL UPDATE TIME | ACCOUNT INFORMATION | NUMBER OF COPIES | UPDATED DATA STORAGE POSITION |
|---|---|---|---|---|---|---|---|
| | COPY LU | APPLICATION TYPE | IDENTIFIER IN APPLICATION DEVICE | | | | |
| 001 | LU110 | MAIL | OBJ001 | | | 2 | STR3/fileA |
| 002 | LU110 | MAIL | OBJ002 | | | 2 | |
| 003 | LU120 | Web | obj003.html | | | 1 | STR3/fileC |
| 004 | LU130 | NAS | file004 | | | 2 | |
| ... | ... | ... | ... | ... | ... | ... | ... |

INFORMATION PROCESSING SYSTEM AND DATA MANAGEMENT METHOD

CROSS-REFERENCES TO RELATED APPLICATIONS

This application relates to and claims priority from Japanese Patent Application No. 2007-285524, filed on Nov. 1, 2007, the entire disclosure of which is incorporated herein by reference.

BACKGROUND

The invention relates generally to a technique for providing, in a system where various application apparatuses operate, a client device with a unified means for accessing data in all those application apparatuses.

Examples of conventional techniques for accessing, with a unified means, data in various application apparatuses include enterprise search technology, SRB (Storage Resource Broker), GNS (Global Namespace), XML (Extensible Markup Language), Gmail file system, and web services.

Enterprise search technology is designed to enable cross-application apparatus search of data existing in a system. The enterprise search technology is a technique for referring to data from each application apparatus, creating an index from keywords contained in the data, and returning a list of locations where searched for data is stored in response to a data search request from a client device.

When actual data is accessed in that technique, an interface provided by an application apparatus that manages the data is used, so no unified access method is provided. However, in this technique, data is converted into text and the thus converted text data is cached in a search server, so that a client device can refer to the text data with a unified method such as a text display tool (for enterprise search technology, see http://www.fastsearch.com/thesolution.aspx?m=376).

SRB and GNS technology provides a unified means for accessing data in geographically dispersed storage apparatuses. A storage apparatus is connected to the Internet and realizes data search or access from arbitrary locations. In this case, the storage apparatus is a target of a data search or access made mainly by a file server (for SRB technology, see http://www.sdsc.edu/srb/Pappres/SRB-overview.ppt; for GNS technology, see http://www.onstor.com/global_namespace.php).

XML technology unifies data formats into XML and has all application apparatuses provide an XML interface, thereby enabling a client device to access data in all application apparatuses in a unified XML format (for XML technology, see http://www.w3.org/TR/xml11/). In a manner similar to XML technology, web service technology has application apparatuses provide an interface for accessing data based on HTTP, thereby enabling a client device to access, using a unified web service interface, data in application apparatuses (for web service technology, see http://www.w3.org/TR/ws-arch/).

The Gmail file system is a technique for using a mail server as a file system. Files or management information used for managing a file system are stored as messages in a mail server (for Gmail file system technology, see http://richard.jones.name/google-hacks/gmail-file system/gmail-file system.html).

However, although the conventional enterprise search technology and Gmail file system technology enable reference to text-converted data using a unified method, data cannot be updated in the above technology.

The conventional SRB technology and the GNS technology can be used in storage apparatuses having a predetermined data access interface such as a file server, but cannot be used in application apparatuses using various interfaces. For example, a file sharing protocol called a network file system (NFS) is used as a data access interface.

In conventional XML technology, application apparatuses have to be made compliant with XML. Therefore, the technology cannot be used in application apparatuses that do not support existing XML. The web service technology also cannot be used in application apparatuses that do not support that technology.

As described above, with those conventional techniques, a client device cannot refer to or update, using a unified method, data in various application apparatuses, and this is inconvenient to a user of the client device.

SUMMARY

The invention was made in light of the above described situation, and its object is to provide an information processing system and data management method with significantly improved usability.

To achieve the above object, the invention provides an information processing system including: a first application apparatus for managing, in a first volume in a storage apparatus, first data recorded in a predetermined format; a second application apparatus for managing, in the first volume in the storage apparatus, second data recorded in a format other than the format of the first data; a server device for accessing the first data and the second data; and a client device for accessing the server device and using the first data and the second data, wherein the server device comprises: an allocation unit for allocating a unique identifier to each of the first data and the second data; a management unit for managing a correspondence between each identifier and an access method for accessing the first data or the second data identified by that identifier; a presentation unit for presenting the identifier managed by the management unit to the client device; a conversion unit for converting an identifier-specifying request from the client device for access to the first data or the second data into a request for access to the first data or the second data corresponding to the identifier using the access method corresponding to the identifier, the correspondence being managed by the management unit; and a data access unit for requesting access to the first data or the second data using the access method converted to by the conversion unit and sending an access result to the client device.

The invention also provides a data access method for an information processing system including a first application apparatus for managing, in a first volume in a storage apparatus, first data recorded in a predetermined format; a second application apparatus for managing, in the first volume in the storage apparatus, second data recorded in a format other than the format of the first data; a server device for accessing the first data and the second data; and a client device for accessing the server device and using the first data and the second data, the method including: a first step of allocating, under the control of an allocation unit in the server device, a unique identifier to each of the first data and the second data; a second step of managing, under the control of a management unit in the server device, a correspondence between each identifier and an access method for accessing the first data or the second data identified by that identifier; a third step of presenting, under the control of a presentation-unit in the server device, the identifier managed in the second step to the client device; a fourth step of converting, under the control of a conversion unit in the server device, an identifier-specifying request from the client device for access to the first data or the second data into a request for access to the first data or the second data corresponding to the identifier using the access method corresponding to the identifier, the correspondence being managed in the second step; and a fifth step of requesting, under the control of a data access unit in the server device, access to the first data or the second data using the access method converted to in the fourth step.

The invention also provides an information processing system comprising: a first application apparatus for managing, in a first volume in a storage apparatus, first data recorded in a predetermined format; a second application apparatus for managing, in the first volume in the storage apparatus, second data recorded in a format other than the format of the first data; a server device for accessing the storage apparatus storing the first data and the second data; and a client device for accessing the server device and using the first data and the second data, wherein the server device includes: a copy data creation unit for creating copy data of the first data and the second data; an allocation unit for allocating a unique identifier to each of the copy data of the first data and the second data; a management unit for managing a correspondence between the identifier and a method for converting, into a shared format, the format of the first data or the second data identified by the identifier; a presentation unit for presenting, to the client device, the identifier managed by the management unit; a conversion unit for reading, when receiving from the client device an identifier-specifying request for reference to the first data or the second data, the copy data of the first data or the second data corresponding to the specified identifier from the storage apparatus, and converting the format of the copy data of the first data or the second data into the shared format associated, by the management unit, with the identifier; and a data transmission unit for sending, to the client device, the copy data of the first data or the second data having the format converted, by the conversion unit, into the shared format.

With the above configuration, a data user of a client device can access, with a unified method, data in various application apparatuses, without the need to worry about different access means in each application apparatus. Accordingly, the data utilization is improved.

The present invention can realize an information processing system and a data management method with significantly improved usability.

Other aspects and advantages of the invention will be apparent from the following description and the appended claims.

BRIEF DESCRIPTION OF THE DRAWINGS

FIG. 5 is a conceptual diagram illustrating a data management table.

FIG. 6 is a conceptual diagram illustrating an application registration/management table.

FIG. 7 is a conceptual diagram illustrating an example of conversion between NFS and IMAP4.

FIG. 8 is a conceptual diagram illustrating an application LU management table.

FIG. 9 is a conceptual diagram illustrating a data relationship management table.

FIG. 14 is a conceptual diagram illustrating a request format for a search request.

FIG. 15 is a flowchart showing a search processing routine.

FIG. 16 is a conceptual diagram illustrating an example of rearrangement of search results based on data-related information.

FIG. 17 is a conceptual diagram illustrating a request format for a data creation request.

FIG. 18 is a flowchart showing a data creation processing routine.

FIG. 19 is a conceptual diagram illustrating a request format for a data write request.

FIG. 20 is a flowchart showing data write processing routine.

FIG. 25 is a conceptual diagram illustrating a request format for an attribute reference request.

FIG. 26 is a flowchart showing an attribute reference processing routine.

FIG. 27 is a conceptual diagram illustrating a request format for an attribute update request.

FIG. 28 is a flowchart showing an attribute update processing routine.

FIG. 30 is a conceptual diagram illustrating a data management table in the second embodiment.

DETAILED DESCRIPTION OF PREFERRED EMBODIMENTS

The embodiments of the invention will be described below with reference to the drawings.

1. First Embodiment

Figure 1:
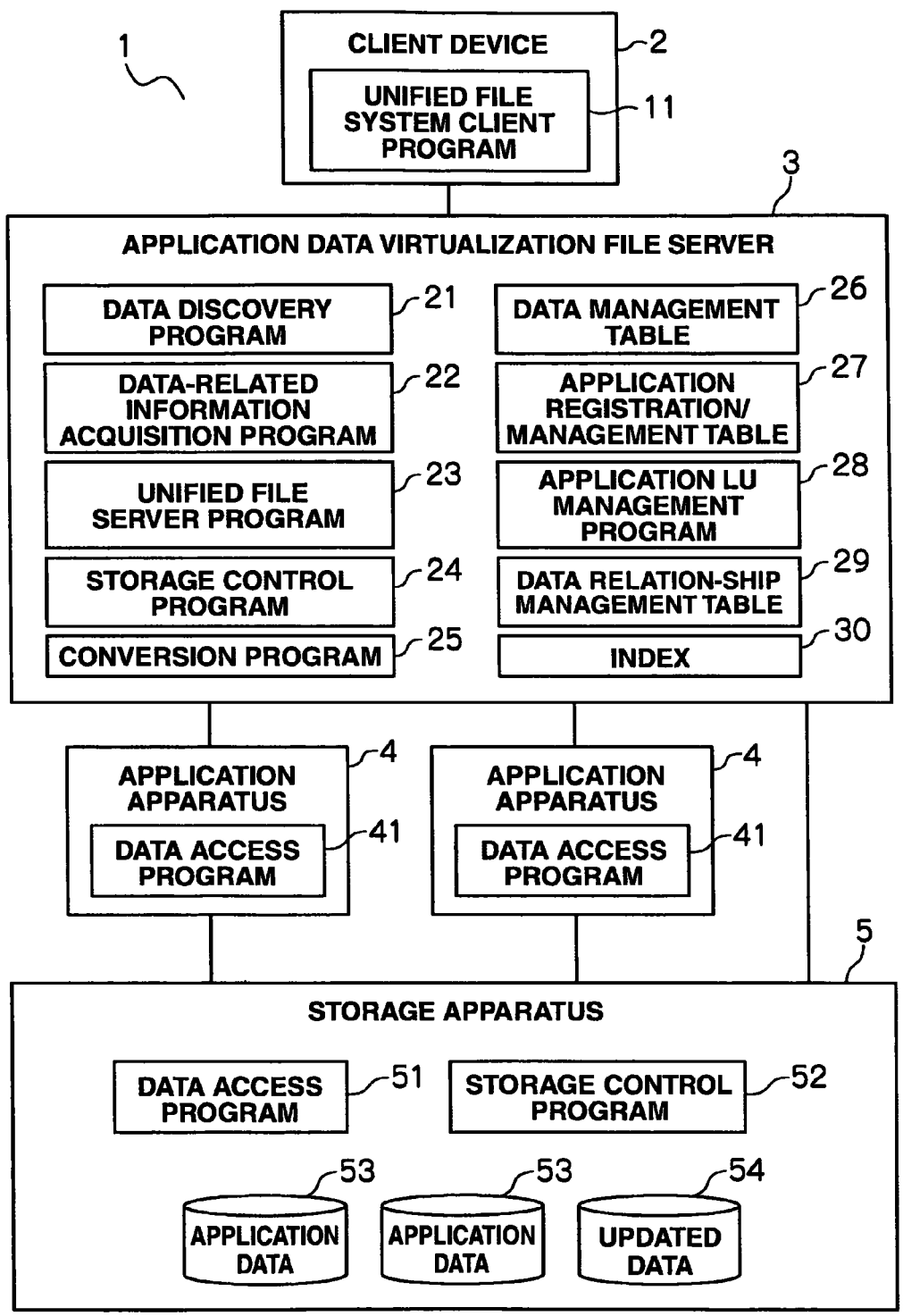
FIG. 1 is a block diagram showing a schematic configuration for an application data virtualization system in a first embodiment.

FIG. 1 shows a configuration for an application data virtualization system 1. The application data virtualization system 1 includes at least one client device 2, application data (the data managed by an application apparatus 4) virtualization file server 3, at least one application apparatus 4 (also referred to as "app(s)."), and at least one storage apparatus 5.

The client device 2 is a computer that accesses, using a unified method, application data via the application data virtualization file server 3, and includes a unified file system client program 11.

Figure 2:
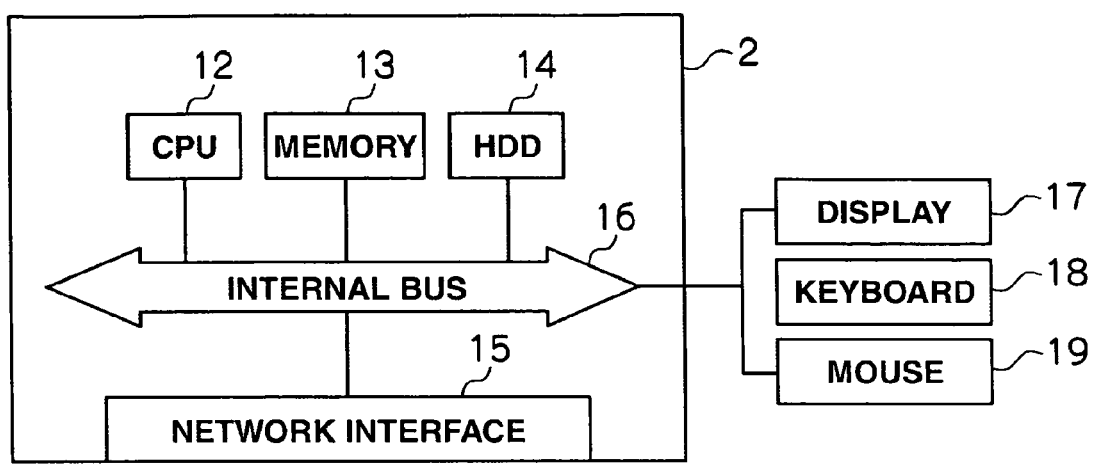
FIG. 2 is a block diagram showing a hardware configuration for a client device.

FIG. 2 shows a hardware configuration for the client device 2. Components of the client device 2 include a CPU (Central Processing Unit) 12, memory 13, a HDD (Hard Disk Drive) 14, and a network interface 15, which are connected to each other via an internal bus 16. The client device 2 is connected to user interfaces: a display 17, keyboard 18, and a mouse 19.

The client device 2 is connected via the network interface 15 to a network to communicate with the application data virtualization file server 3. Examples of a possible network include Ethernet (E, and examples of a possible communication protocol include TCP/IP (Transmission Control Protocol/Internet Protocol). The unified file system client program 11 is stored in the HDD 14.

The application data virtualization file server 3 is a server for virtualizing various kinds of application data and providing the client device 2 with a unified data access method, and includes a data discovery program 21, a data-related information acquisition program 22, a unified file server program 23, a storage control program 24, and a conversion program 25. The application data virtualization file server 3 also includes a data management table 26, an application registration/management table 27, an application LU management table 28, a data relationship management table 29, and an index 30, which are management information.

Figure 3:
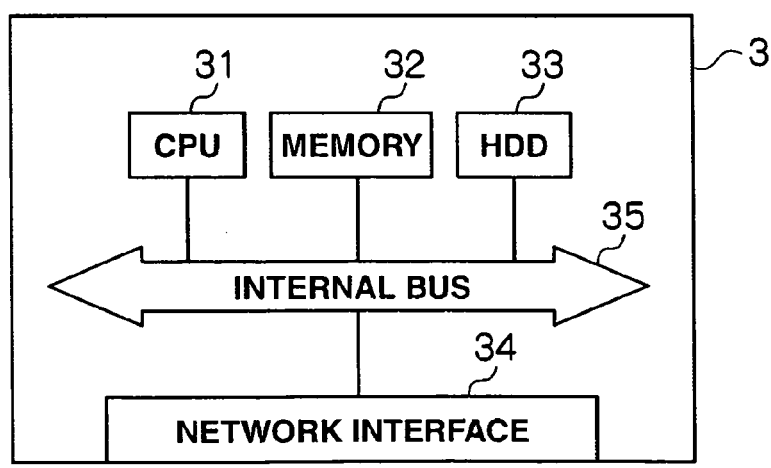
FIG. 3 is a block diagram showing a hardware configuration for the application data virtualization file server.

FIG. 3 shows a hardware configuration for the application data virtualization file server 3. Components of the application data virtualization file server 3 include a CPU 31, memory 32, an HDD 33, and a network interface 34, which are connected to each other via an internal bus 35.

The application data virtualization file server 3 is connected via a network interface 34 to a network to communicate with the client device 2, the application apparatus 4, and the storage apparatus 5.

The data discovery program 21, the data-related information acquisition program 22, the unified file server program 23, the storage control program 24, the conversion program 25, the data management table 26, the application registration/management table 27, the application LU management table 28, the data relationship management table 29, and the index 30 are stored in the HDD 33.

The application apparatus 4 is a server for running operations using application data. Examples of the application apparatus 4 include a mail server, a WEB server, and a file server (Network Attached Storage NAS). In this embodiment, the content of the operations run by each application apparatus 4 or processes therefore will not be specifically explained. To embody the invention, the application apparatus 4 executes the data access program 41 to provide a data access function. This data access function is designed to have the application data virtualization file server 3 access, with a method unique to each application apparatus 4, via a network, application data recorded in a predetermined format. For example, if the application apparatus 4 is a mail server, an external computer can access emails in the mail server using IMAP4(Internet Message Access Protocol v4) protocol.

Although the hardware configuration for each application apparatus 4 varies depending on the type of the apparatus, an example is a PC server configuration similar to the application data virtualization file server 3 shown in FIG. 3.

The application apparatus 4 is connected via a network interface to a network to communicate with the application data virtualization file server 3 and the storage apparatus 5. The data access program 41 is stored in the HDD in the application apparatus 4.

A user or a client device (not shown in FIG. 1) that directly uses the application apparatus 4 also exists. The user or the client device that directly uses the application apparatus 4 updates application data. For example, if the application apparatus 4 is a mail server and a mailer is compliant with software in the client device, the user or the client device directly uses the application apparatus 4 and thus updates the content of application data by directly reading/writing emails.

The storage apparatus 5 stores, respectively in volumes (Logical Unit(s):LU(s)) 53 and 54, application data and updated data in the application data virtualization file server 3. The storage apparatus 5 executes the data access program 51 to provide a data access function for accessing data in the volumes 53 and 54. For example, the storage apparatus 5 provides, using a data access protocol such as SCSI (Small Computer System Interface) or NFS (Network File System), data access means to the application data virtualization file server 3 and the application apparatus 4.

The storage apparatus 5 executes the storage control program 52 to provide the application data virtualization file server 3 with a storage control function for changing the configuration of the storage apparatus 5 or acquiring a copy of the volumes 53 and 54, or similar. The application data virtualization file server 3 executes the storage control program 24 and makes a request for the storage apparatus 5 to refer to or change its configuration information, or create a copy of a volume 53 or 54, or similar. The storage control function is provided for executing processing based on the content of each request. Methods for achieving the above data access function or the storage control function area already known, so their explanation has been omitted in this embodiment.

Figure 4:
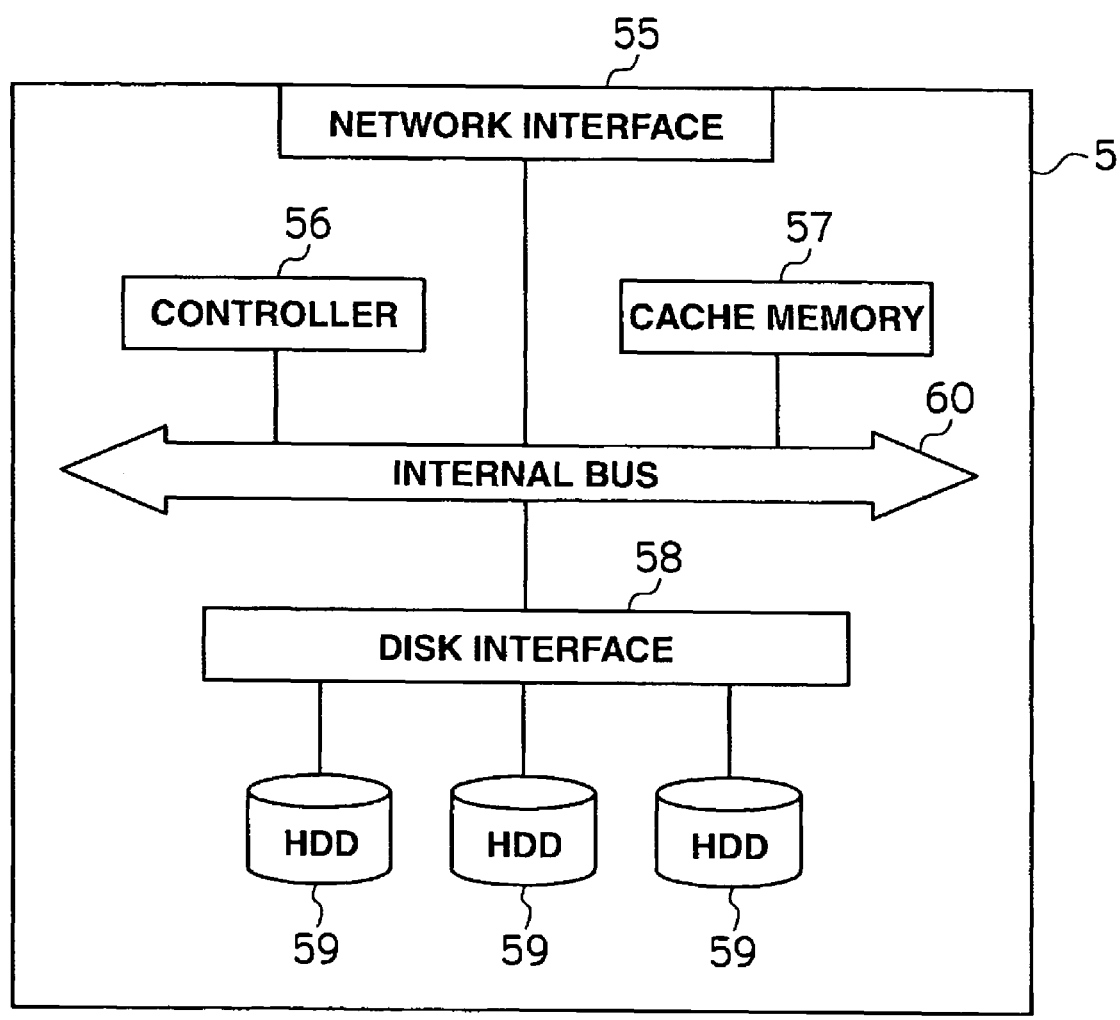
FIG. 4 is a block diagram showing a hardware configuration for a storage apparatus.

FIG. 4 shows the hardware configuration for the storage apparatus 5. The storage apparatus 5 includes a network interface 55, a controller 56, cache memory 57, a disk interface 58, and a HDD 59. The components other than the HDD 59 are connected to each other via an internal bus 60. The HDD 59 is connected to a disk interface 58.

The storage apparatus 5 is connected via a network interface 55 to a network to communicate with the application data virtualization file server 3 and the application apparatus 4. The data access program 51 and the storage control program 52 are stored in the HDD 59 in the application apparatus 4.

FIG. 5 shows an example of the data management table 26. The data management table 26 contains information used for managing all application data discovered by the application data virtualization file server 3. The data management table 26 includes a virtual identifier column 26A, an original storage position column 26B, an original update time column 26C, an account information column 26D, a number of copies column 26E, and an updated data storage position column 26F.

The virtual identifier column 26A holds identifiers each uniquely allocated to application data after the application data virtualization file server 3 'discovers' (finds) the application data. The client device 2 requests, specifying a virtual identifier, data access from the application data virtualization file server 3.

The original storage position column 26B holds information that indicates the position of specified data to access. When the application data virtualization file server 3 accesses data in the application apparatus 4, the original storage position column 26B specifies an IP address 26G of the application apparatus 4 that stores the data, an application type 26H, which is the type of the application apparatus 4, and an inter-application identifier 26I for identifying data in the application apparatus 4. The IP address 26G indicates which application apparatus 4 to communicate with, the application type 26H indicates which protocol or interface to use for data access, and the inter-application identifier 26I specifies the data in the application apparatus 4. For example, if the application apparatus 4 is a mail server, IMAP4 protocol is used, and the inter-application identifier 26I is a UID (Unique Identifier) defined by the IMAP4.

The original update time column 26C holds information indicating when the application data was updated. The original update time column 26C is used by the application data virtualization file server 3, when discovering application data, to check whether or not the data has been updated since the previous discovery. The details will be described later. If the client device 2 updates non-overwritable data via the application data virtualization file server 3, the updated data is stored in the updated data volume 54. Meanwhile, a user of the application apparatus 4 may directly update the same data not via the application data virtualization file server 3 in some cases. The application data virtualization file server 3 refers to the original update time column 26C to acquaint itself with that kind of data update.

The account information column 26D holds information indicating an account name, a password for accessing the data, and a data access right. The details will be described later. In the processes that will be described in more detail later, the application data virtualization file server 3 uses, after receiving a data access request from the client device 2, the account information column 26D to check whether or not the client device 2 has the right to access the data, and, if so, the client device 2 accesses the data using the account name and the password stored in the account information column 26D.

The number of copies column 26E holds information not necessary for provision of a unified access method. The number of copies column 26E is used to improve, utilizing inter-data dependency, efficiency in data access made by the client device 2, and that is another object of the invention.

In this embodiment, information about a copy relationship between data is used as an example of data-related information. When the storage apparatus 5 makes, using a data copy function, a replication of data in another volume 53 or backup software makes a backup data of data in another volume 53, the storage apparatus 5 creates a copy of the original data. The inter-data copy relationship information is information indicating which data are in a copy relationship. The number of copies managed by the data management table 26 is information indicating, if data has been copied several times, the total number of copies of that data. In this embodiment, it is assumed that the importance of data has a correlation with the number of copies, since, to prevent data loss, more important information is copied a larger number of times.

The application data virtualization file server 3 acquires the copy relationship information from the storage apparatus 5 or a backup server (not shown in the figures) for backing up data. The application data virtualization file server 3, when searching data, arranges data in the search result in descending order of the number of copies so that important data comes at the head of the search result. Accordingly, a user can easily find important data.

The updated data storage position column 26F stores a volume for storing, when updating non-updatable application data, the updated data other than the volume storing application data. When updating the non-updatable application data, the application data virtualization file server 3 uses the information in the updated data storage position column 26F to manage the position where the updated data is stored.

FIG. 6 shows an example of the application registration/management table 27. The application registration/management table 27 is used to manages a list of the application apparatuses 4 managed by the application data virtualization file server 3, and specify methods for accessing application data. The application registration/management table 27 includes a column 27A storing IP addresses of the application apparatuses 4, an application type column 27B, an account information list column 27C, an updatability status column 27D, and a conversion program information column 27E.

The content of the application registration/management table 27 is set via a management terminal by an administrator of the application data virtualization file server 3 before activating the system. If the content has to be changed, e.g., the number of application apparatuses 4 to be virtualized is increased/decreased, the administrator changes the content of the application registration/management table 27 and, if necessary, notifies the application data virtualization file server 3 of that change, or restarts the system.

The IR address column 27A and the application type column 27B are used to specify the relevant application apparatus 4.

The account information list column 27C holds lists of account names and passwords necessary for the application data virtualization file server 3 to access all application data if plural users use the application data and the application data is separate for each user. If there is an account that has root authority with which all application data can be accessed with that single account, only that root account is necessary. Meanwhile, if several accounts are necessary to access all application data, plural accounts are necessary and those accounts are managed in the form of a list. For example, if the application apparatus 4 is a mail server, users have individual accounts and the emails each user can access are different. Therefore, a user of the client device 4 needs the accounts of all users to access all emails.

The updatability status column 27D holds information indicating whether or not application data may be updated via the application data virtualization file server 3. If updatable, "updatable" is stored in the updatability status column 27D. If not updatable, "not updatable" is stored. For example, if the application apparatus 4 is a mail server, a user usually sends/receives emails via a mailer. Therefore, if those emails are modified y the application data virtualization file server 3, which is a third party, the consistency of the data cannot be maintained and a problem occurs. Accordingly, "not updatable" is stored in the updatability status column 27D. In another example, if the application apparatus 4 is a web server, no data update means exists originally, so "not updatable" is stored in the updatability status column 27D. If the application apparatus 4 is a file server (NAS), anyone with a data access right can update data and no operational problem occurs, so a means for updating data is provided. Accordingly, "updatable" is stored in the updatability status column 27D.

The conversion program information column 27E holds locations of conversion programs 25 for converting between a unified access means and a data access means unique to each respective application apparatus 4. For example, if the client device 2 issues a data reference request using a unified access means, the application data virtualization file server 3 specifies the application apparatus 4 that has the reference-requested data and activates or calls the conversion program 25 corresponding to the application apparatus 4 to issue, to that application apparatus 4, a request for reference to the relevant data in that application apparatus 4 using the access means provided. Then the application data virtualization file server 3 converts the data reference request using the unified access means into a data reference request using an access method unique to that application apparatus 4, and sends the thus converted reference request to the application apparatus 4.

The conversion program information column 27E is used to specify which conversion program 25 to use.

Various modes of the conversion programs 25 may be available depending on the difference between the unified access means and access means unique to the application apparatuses 4. Since modes for all possible combination of all unified access means and access means unique to all application apparatuses 4 cannot be explained, this embodiment will simply describe the case where the unified access means is a network file system (NFS) and the access means unique to the application apparatus 4 is an IMAP4.

FIG. 7 shows a conversion table 61 used for conversion between, for example, the NFS and the IMAP4 according to the conversion program 25. This conversion table 61 includes a column 61A for the IMAP4, which is the access means unique to the application apparatus 4, and a column 61B for the NFS, which is a unified access means. The access means will be explained below.

When considering the conversion method, two main points have to be determined. The first point is correspondence between data, which is indicated in the data correspondence section 61C. The second point is correspondence between commands, which is indicated in the command correspondence section 61D. Therefore, the conversion table 61 includes the data correspondence section 61C and the command correspondence section 61D.

The data correspondence section 61C contains information that determines the correspondence concerning an application type 61E, data unit 61F, data name 61G, data identifier 61H, attribute information 61I, application extension information 61J, user name 61K, password 61L, and access right 61M.

The application type 61E is a name for distinguishing each access means.

The data unit 61F is a unit used by the client device 2 to handle data as a single unit. In the conversion table 61, messages managed by IMAP4are handled as a single data unit 61F, which is associated with a single file in the NFS. For example, a file reference request is interpreted as a message reference request.

The data name 61G is a name given to data that can be read by a user. In the conversion table 61, a subject in a message is used as a data name 61G, which is associated with a file name in the NFS. For example, a list of message subjects is output when files are listed in the NFS (i.e., in the client device 2).

The data identifier 61H is information for identifying data. In the conversion table 61, the IMAP provides an UID to each message to identify the message, and that UID is used as the data identifier 61H in the IMAP. In the NFS, a path name corresponding to the UID is used as an identifier in the NFS. For example, when data access is a request specifying a pass name in the NFS, the application data virtualization file server 3 accesses the relevant message using the corresponding message UID.

The attribute information 61I is information pertaining to data. In the conversion table 61, in the case of messages, the message size is the attribute information 61I, which is associated with the file size in the NFS. For example, if attribute information about a file in the NFS is displayed, the attribute information about a corresponding message in the IMAP4 is displayed. In the NFS, file creation times or last access times or similar that are not included in the information about messages also have to be presented to the client device 2. If the client device 2 requests presentation of those kinds of information, the application data virtualization server 3 always returns invalid information, or increases entries in the data management table 26 and also manages that information.

The application extension information 61J is attribute information that the IMAP4 has but the NFS does not have. For example, attribute information existing in the IMAP4 includes "unread" flags and "returned" flags of messages, or similar. That information is unnecessary for the client device 2 to access data via the NFS, so, basically, it does not have to be considered. Note that the invention is not limited to the above described embodiment, and the NFS may be extended so that the client device 2 can refer to and update the attribute information only concerning the application apparatuses 4.

The user name 61K is an account name (account information) used for authentication prior to data access. If the account name in the NFS differs from the account name in the IMAP4, the correspondence between those two account names has to be managed in the conversion table 61. For example, the account name ("User A") in the NFS is associated with the account name ("Account X") in the IMAP4. Since the correspondence is managed using the user name 61K in the conversion table 61, if data access is requested using the account name ("User A") in the client device 2, the application data virtualization file server 3 accesses a message in the IMAP4using the account name (Account X) in the IMAP4.

Like the user names, the correspondence between the passwords 61L is also managed in the conversion table 61.

The access right 61M is the right to access data. In the NFS, it is necessary to check, for each piece of data, who can access the data and what kind of right each user has. The application data virtualization file server 3 conducts the above check by referring to the access right 61M for messages in the IMAP4. For example, in the IMAP4 only the owner of a message has the right to access the message. Therefore, if a user other than the massage owner requests access to that message via NFS, the application data virtualization file server 3 executes processing for rejecting the access.

The command correspondence section 61D is used to determine which command in the IMAP4 is associated with which data access command supported by the NFS. More specifically, the command correspondence section 61D includes entries for a login command 61N, listing command 61O, attribute reference command 61P, attribute update command 61Q, creation command 61R, read command 61S, write command 61T, and delete command 61U. Each of those commands in the NFS is associated with a command in the IMAP4.

The login command 61N is a command for login to the IMAP4 when using IMAP4. The login command 61N does not exist in the NFS. When accessing data in the IMAP4, the application data virtualization file server 3 logs in to the IMAP4 using a login command and account information for the IMAP4. After finishing data access, the application data virtualization file server 3 logs off from the IMAP4. Explanation of login/logoff being conducted before/after data access has been omitted to avoid unnecessary repetition.

The listing command 61O is a command for acquiring a list of existing data. Since in some cases data to be accessed in the NFS is determined after a data search, a "lookup" command (LOOKUP) corresponds to the listing commands 61O. Meanwhile, since in the IMAP4 messages are listed when discovering data, a "search" command corresponds to the listing commands 61O too.

The attribute reference command 61P is a command to refer to attribute information about files. A get attribute command (GETATTR) in the NFS and a store command (STORE) in the IMAP4 correspond to the attribute reference command 61P. If the application data virtualization file server 3 receives, from the client device 2, the get attribute command (GETATTR) that is the attribute reference request, the application data virtualization file server 3 refers, using a "store" command (STORE) in the IMAP4, to attribute information about a message in a mail server (application apparatus 4).

The attribute update command 61Q is a command to update attribute information about a file. A set attribute command (SETATTR) in the NFS corresponds to the attribute update command 61Q, but no attribute information update command exists in the IMAP4. Therefore, if the application data virtualization file server 3 receives, from the client device 2, the set attribute command (SETATTR) that is an attribute update request, the application data virtualization file server 3 copies the message to the updated data volume 54, then the attribute information about the above copied message is directly updated.

The creation command 61R is a command to create a new file. A creation command in the NFS and an append command (APPEND) in the IMAP4 correspond to the creation command 61R. In the NFS, empty files with no content are created. Meanwhile, in the IMAP4, messages including fixed content are created. Therefore, even though both of those two commands are creation commands, the specification of the commands differs on that point. Since those commands have different specifications, the application data virtualization file server 3 adds a file, not in the mail server (application apparatus 4), but in an updated data volume 54. However, if a file close command exists on the unified interface side (i.e., in the NFS), the content of a file is fixed when the close command is issued. Accordingly, even though the specification of the creation commands is different as mentioned above, that fixed file may be written as a message to the mail server.

The read command 61S is a command to refer to a file. A read command (READ) in the NFS and a fetch command (FETCH) correspond to the read command 61S. The application data virtualization file server 3 reads, when receiving a file reference request (read command (READ)) from a client device 2, a message using the "fetch" command (FETCH) in the IMAP4 and returns the result to the client device 2.

The write command 61T is a command to update a file. A write command (WRITE) in the NFS corresponds to the write command 61T, but no command to update a message exists in the IMAP4. Therefore, when receiving a file update request (write command (WRITE)) from the client device 2, the application data virtualization file server 3 copies, in the updated data volume 54, a corresponding message and updates the thus copied message.

The delete command 61U is a command to delete a file. A remove command (REMOVE) in the NFS and an expunge command (EXPUNGE) in the IMAP4 correspond to the delete command 61U. When receiving a file delete request (remove command (REMOVE)) from the client device 2, the application data virtualization file server 3 deletes the corresponding message using an "expunge" command (EXPUNGE).

FIG. 8 shows an example of an application LU management table 28. The application data virtualization file server 3 refers to the application LU management table 28 to check which volume 53 or 54 in the storage apparatus 5 application data for each application apparatus 4 is stored in. The application LU management table 28 specifies the application apparatus 4 based on an IP address column 28A and application type column 28B. A used LUN column 28C holds LUNs where application data are stored. The application LU management table 28 may be input manually by an administrator. Alternatively, a storage management server (not shown in the figures) that sets a volume 53 for storing data may inquire at a server that manages the storage apparatus 5 and automatically prepare the application LU management table 28 by analyzing information about a correspondence between the application apparatus 4 and the volumes 53 and 54.

FIG. 9 shows an example of a data relationship management table 29. The data relationship management table 29 is a table for acquiring and managing information about data that cannot be acquired from the application apparatuses 4. The information that cannot be acquired from the application apparatuses 4 includes information about the relationship of data copied using a copy function in the storage apparatus 5, information about data backup using backup management software, and information about the reliability and performance of the storage apparatus 5 that stores the relevant data, or similar. Examples of reliability information about the storage apparatus 5 include the RAID level of each volume 53 that stores application data. Examples of performance information about the storage apparatus 5 include whether the drive type of that volume 53 is Fibre Channel or SATA (Serial AT Attachment).

Figure 10:
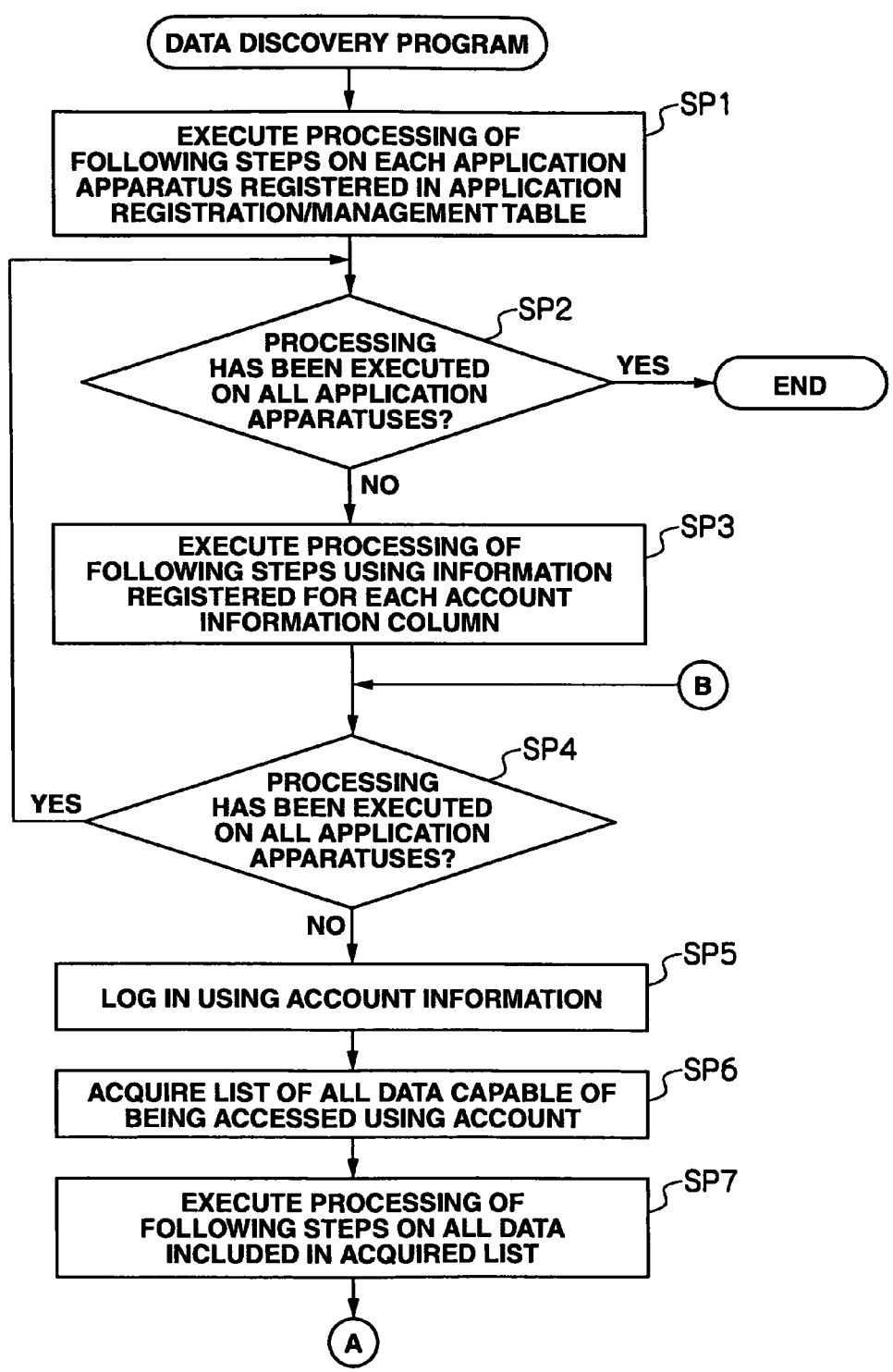
FIG. 10 is a flowchart showing a processing routine for a data discovery function.

The data relationship management table 29 varies depending on which related information is the target. The example shown in FIG. 10 is targeted at data copy in the volumes 53 in the storage apparatus 5 and application data backup executed by backup management software in the backup management software (not shown in the figures). The following explanation is based on that assumption.

The data relationship management table 29 includes a data management software IP address column 29A, a data management software type column 29B, data-related information acquisition method column 29C, copy source LUN column 29D, and copy destination LUN column 29E.

The data management software is software, other than the application apparatuses 4, for managing application data, and includes a program for creating a copy of the volumes 53 in the storage apparatus 5 and backup management software, or similar.

The application data virtualization file server 3 recognizes, from the IP address column 29A, an access target of the data management software, and specifies the data management software by referring to the data management software type column 29B. The data-related information acquisition method column 29C holds methods for referring to data-related information from the data management software. For example, if the storage control program 24 is held in the data-related information acquisition method column 29C, the application data virtualization file server 3 can acquire the data-related information from the storage apparatus 5 by running the storage control program 24. The copy source LUN column 29D holds LUNs storing target data for data copy or backup in the storage apparatus 5. For example, in the case of data backup, the copy source LUN 29D is the volume 53 that stores the application data. The copy destination LUN column 29E holds LUNs storing copy destination or backup data in the storage apparatus 5.

Figure 11:
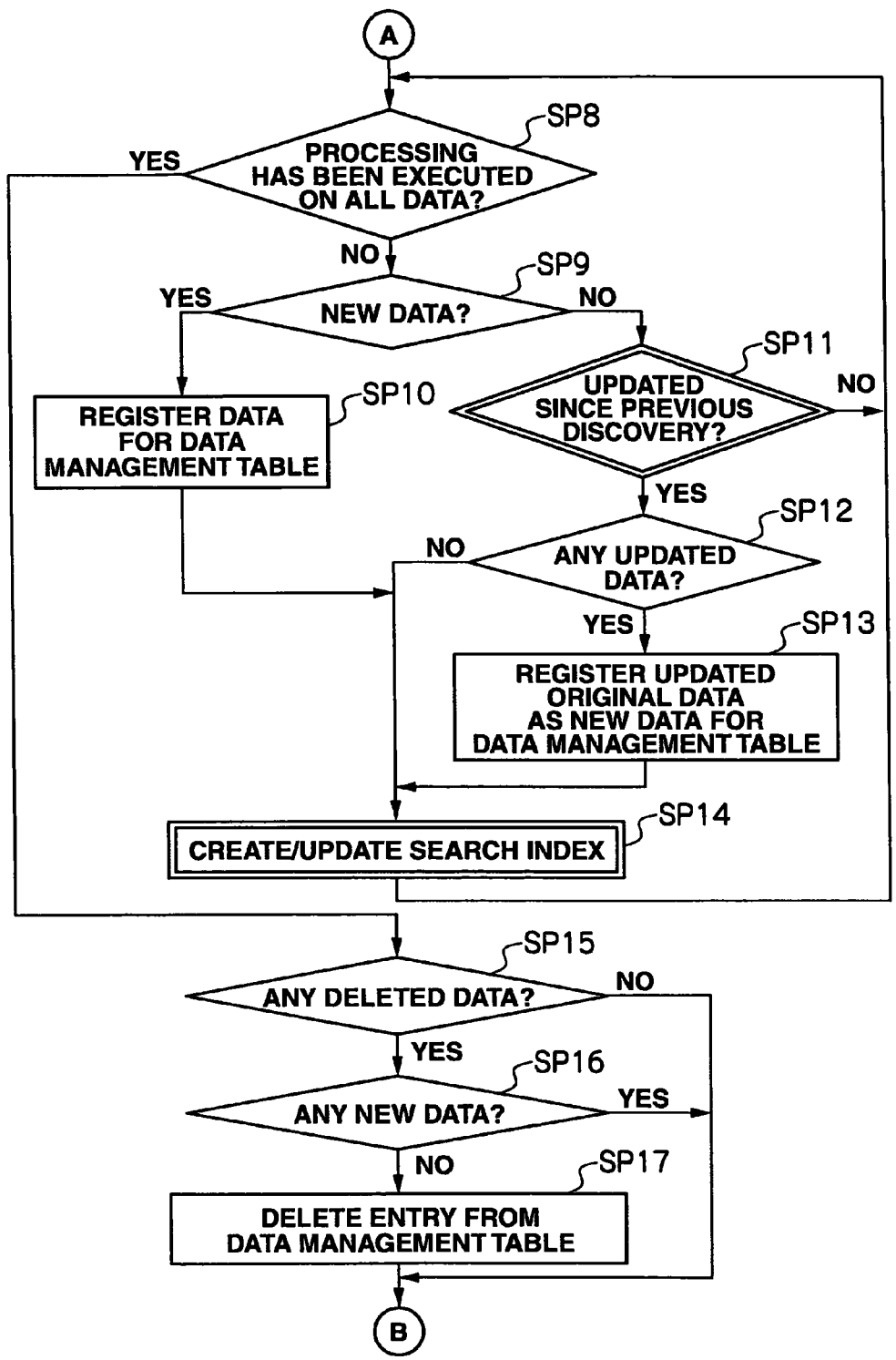
FIG. 11 is a flowchart showing a processing routine for the data discovery function.

FIGS. 10 and 11 show a processing flow for a data discovery function achieved by having the CPU 31 in the application data virtualization file server 3 execute the data discovery program 21. The data management table 26 is created/updated and an index is also created/updated by the data discovery function.

The application data virtualization file server 3 executes the processing in step SP2 and subsequent steps on each application apparatus 4 corresponding to the IP address held in the IP address column 27A, for example, every one hour sequentially from the top of the entries in the application registration/management table 27 (step SP1).

The application data virtualization file server 3 checks whether or not the processing of step 2 and subsequent steps has been executed on the application apparatuses 4 indicated in all entries in the application registration/management table 27 (step SP2). If the processing has been executed on the application apparatuses 4 indicated in all entries in the application registration/management table 27 (step SP2:YES), the application data virtualization file server 3 terminates the processing for the data discovery function.

If not (step SP2:NO), the application data virtualization file server 3 refers to the account information list column 27C in the application registration/management table 27 and executes, using account information, processing of step SP4 and subsequent steps sequentially from the top of the entries in the account information list column 27C (step SP3).

The application data virtualization file server 3 checks whether or not the above processing has been executed for all accounts in the account information list column 27C (step SP4). If the processing has been executed for all accounts in the account information list 27C (step SP4:YES), the application data virtualization file server 3 returns to step SP2.

If not (step SP4:NO), the application data virtualization file server 3 logs in to a relevant application apparatus 4 using the account information held in the account information list column 27C selected in the step SP3 (step SP5).

The application data virtualization file server 3 acquires, using the listing command 61O (for example, a search command) for the application apparatus 4, a list of all data that can be accessed with an account (the client device 2) in use (step SP6).

The application data virtualization file server 3 executes processing of step SP8 and subsequent steps on each piece of data in the above list (step SP7).

The application data virtualization file server 3 checks whether or not the processing has been executed on all data in the list (step SP8). If the processing has been executed on all data in the list (step SP8:YES), the application data virtualization file server 3 proceeds to step SP15.

If not (step SP8:NO), the application data virtualization file server 3 searches the entries in the data management table 26 and checks whether or not data on which the above processing has not been executed is registered as an entry (step SP9). This check is conducted based on whether or not information about the original storage position is found in the data management table 26. If the searched-for data is not registered as an entry, or is new data (step SP9:YES), the application data virtualization file server 3 proceeds to step SP10. If the searched-for data is already registered, or is not new data (step SP9:NO), the application data virtualization file server 3 proceeds to step SP11.

If the data is new data (step SP9:YES), the application data virtualization file server 3 registers the new data for the data management table 26 (step SP10). When doing so, the application data virtualization file server 3 enters, in the original storage position column 26B, the position where the data is stored. The application data virtualization file server 3 acquires, using the attribute reference command 61P (for example, a store command) in the application apparatus 4, the update time of the above data, and enters that update time in the original update time column 26C. The application data virtualization file server 3 registers, for the account information 26D, account information concerning the application apparatus 4 the application data virtualization file server 3 is currently logged in. The application data virtualization file server 3 also acquires, using the attribute reference command 61P, the data access right information and uses that information in the account information 26D too. The application data virtualization file server 3 then enters "0" in the number of copies column 26E and clears the updated data storage position column 26F. After that, the application data virtualization file server 3 proceeds to step SP14.

If the data is already registered (step SP9:NO), the application data virtualization file server 3 checks whether or not the data has been updated since the previous discovery (step SP11). The application data virtualization file server 3 acquires the last update time using the attribute reference command 61P in the application apparatus 4. The application data virtualization file server 3 checks the previous update time by referring to the original update time column 26C in the data management table 26. The application data virtualization file server 3 then compares the current update time with the previous update time. If those update times are not the same, the application data virtualization file server 3 determines that the data has been updated. If the data has been updated (step SP12:YES), the application data virtualization file server 3 proceeds to step SP13. If not (step SP12:NO), the application data virtualization file server 3 returns to step SP8.

The application data virtualization file server 3 refers to the updated data storage position column 26F in the data management table 26 and checks whether or not updated data of the relevant data exists in the updated data updated data volume 54 (step SP12). If the update data exists in the updated data volume 54 (step SP13:YES), the application data virtualization file server 3 proceeds to step SP13. If not (step SP13:NO), the application data virtualization file server 3 updates the original update time in the original update time column 26C in the data management table 26 to the current update time, and proceeds to step SP14.

The application data virtualization file server 3 registers, as new data, the updated original data for the data management table 26 (step SP13). The content of registration processing is the same as step SP10.

The application data virtualization file server 3 refers to the content of the above data using the read command 61S in the application apparatus 4 and creates or updates a search index (step SP14). After that, the application data virtualization file server 3 returns to step SP8. The data configuration for the index and the method for creating the index are the same as those in conventional search techniques, so their explanation has been omitted.

After the processing has been executed on all data (step SP8:YES), the application data virtualization file server 3 compares the data list with the entries in the data management table 26 and checks if any deleted data exists, or if any of the data that exists in the data management table 26 does not exist in the data list (step SP15). If no deleted data exists (step SP15: NO), the application data virtualization file server 3 returns to step SP4. If deleted data exists (step SP15:YES), the application data virtualization file server 3 proceeds to step SP16.

The application data virtualization file server 3 refers to the entry for the deleted data in the updated data storage position column 26F in the data management table 26, and checks whether or not updated data for that data exists in the updated data volume 54 (step SP16). If the updated data exists in the updated data volume 54 (step SP15:YES), the application data virtualization file server 3 returns to step SP4 to leave the data in that state. If the updated data does not exist in the updated data volume 54 (step SP15:NO), the application data virtualization file server 3 proceeds to step SP17.

The application data virtualization file server 3 deletes the entries for the data deleted from the data management table 26 (step SP16), then returns to step SP4.

Figure 12:
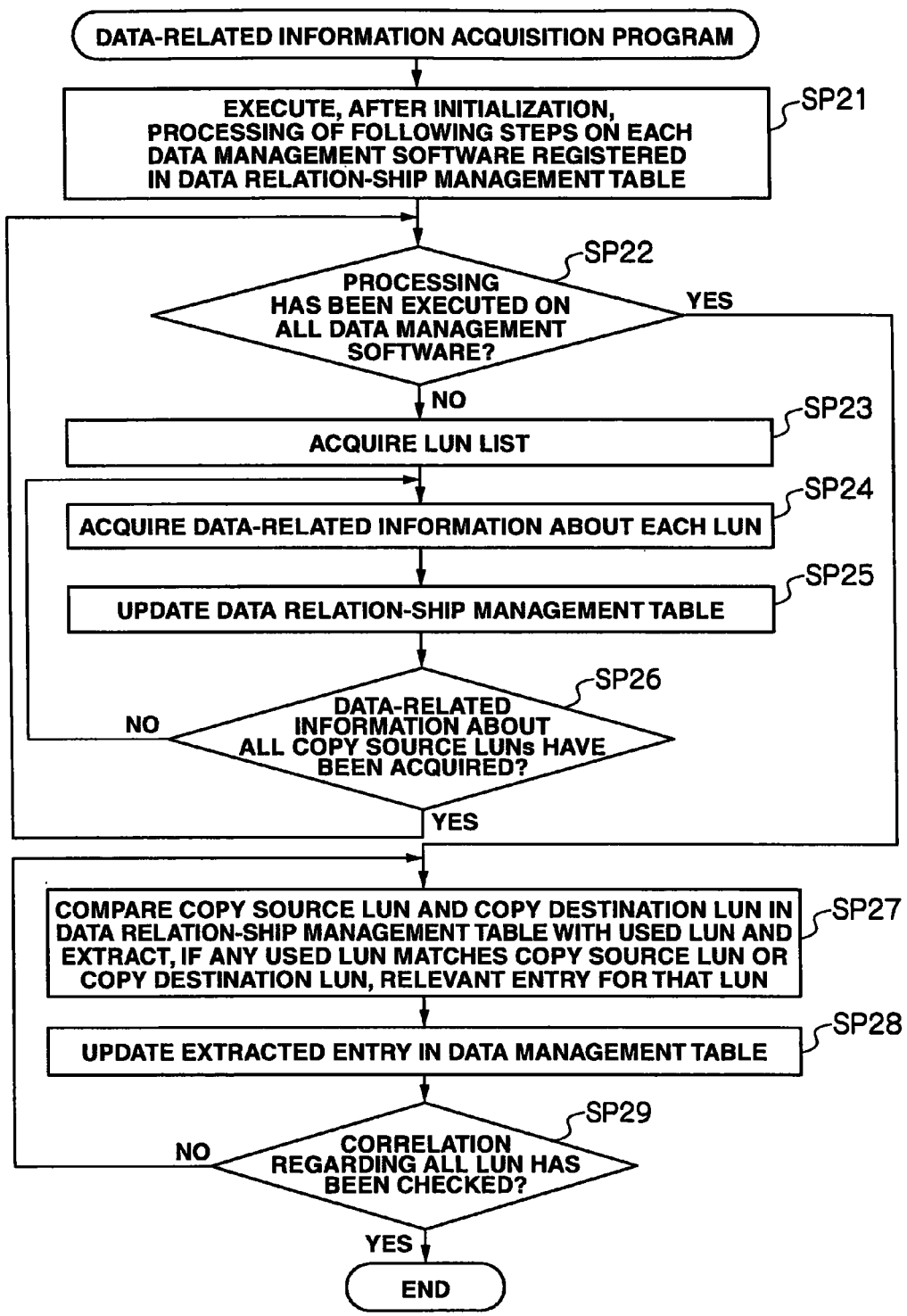
FIG. 12 is a flowchart showing a processing routine for a data-related information acquisition function.

FIG. 12 illustrates a processing flow for the data-related information acquisition function achieved by having the CPU 31 in the application data virtualization file server 3 execute the data-related information acquisition program 22. The data relationship management table 29 is created/update by that data-related information acquisition function.

After all entries in the number of copies column in the data management table 26 are cleared (reset) by entering "0," the application data virtualization file server 3 executes processing of step SP22 and subsequent steps on each data management software from the top of the entries of the entries in the data relationship management table 29 in descending order (step SP21).

If the processing has been executed on all data management software (step SP22:YES), the application data virtualization file server 3 proceeds to step SP27.

If not (step SP22:NO), the application data virtualization file server 3 acquires, from each data management software, a list of all volumes 53 and 54 managed by the relevant data management software by using the means indicated in the data-related information acquisition method column 29C in the data relationship management table 29 (step SP23). When doing so, if the data management software is the storage control program 52, the application data virtualization file server 3 can directly acquire information about the volumes 53 and 54. However, if data management software is backup management software, during regular data backup a file system or an application apparatus 4 is specified as a backup source, so the LUN where the relevant data is stored cannot be specified. Therefore, the application data virtualization file server 3 specifies, using storage control software or similar, based on a backup definition file, the LUN where the backup target data is stored. That specification method can be implemented with conventional techniques.

The application data virtualization file server 3 acquires, based on the acquired list of the volumes 53 and 54, copy relationship information about each of the volumes 53 and 54 (step SP24). If the data management software is the storage apparatus 5, the application data virtualization file server 3 can acquires a copy source LUN and a copy destination LUN. Meanwhile, if the data management software is backup management software, the application data virtualization file server 3 cannot specify the copy destination LUN. Therefore, the application data virtualization file server 3 specifies only the copy source LUN.

The application data virtualization file server 3 registers, for the data relationship management table, the information concerning the acquired copy source LUN and copy destination LUN as the copy source LUN 29D and the copy destination LUN 29E respectively (step SP25).

The application data virtualization file server 3 checks whether or not information concerning all volumes 53 and 54 has been acquired (step SP26). If copy relationship information concerning all volumes 53 and 54 (step SP26:YES) has been acquired, the application data virtualization file server 3 returns to step SP22. If not (step SP26:NO), the application data virtualization file server 3 returns to step SP24.

The application data virtualization file server 3 compares the copy source LUN 29D and the copy destination LUN 29E in the data relationship management table 29 with the used LUN 28C in the application LU management table 28 and checks if the used LUN 28C is the same as the copy source LUN 29D or the copy destination LUN 29E (step SP27).

If any used LUN 28C is the same as the copy source LUN 29D (step SP26:YES), the application data virtualization file server 3 updates the relevant entries in the data relationship management table 29 by adding "1" to the number of copies column 26E in the data management table 26 corresponding to all data the application apparatus 4 has (step SP28). For example, if the used LUN 28C has been copied by the storage control program 52 and backed up by the backup management software, the copy number is set to 2.

If the correlation regarding all used LUNs 28C has been checked (step SP29:YES), the application data virtualization file server 3 terminates the data-related information acquisition processing. If not (step SP29:NO), the application data virtualization file server 3 returns to step SP27.

Figure 13:
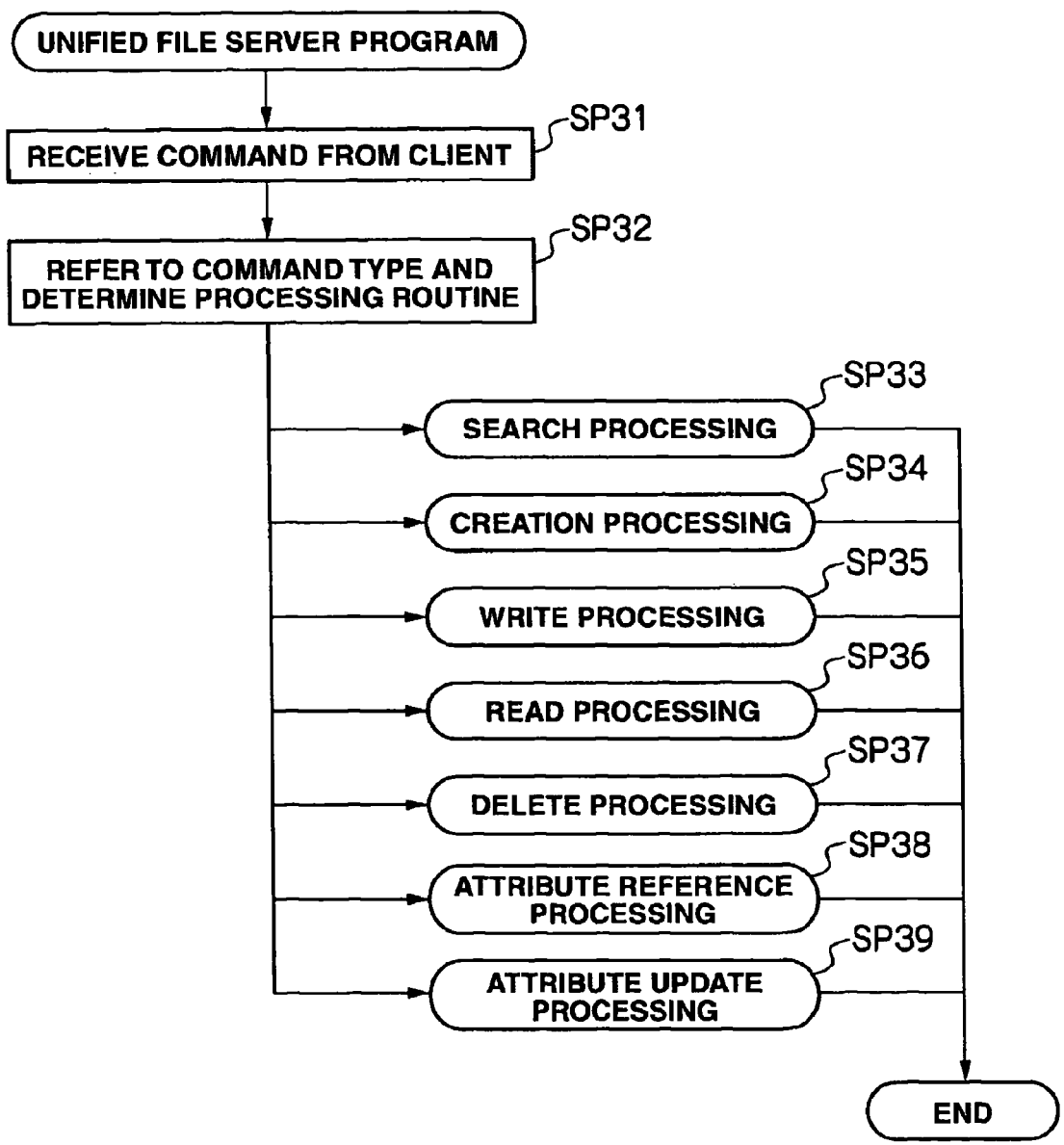
FIG. 13 is a flowchart showing a processing routine for a unified file server function.

FIG. 13 illustrates a processing flow for a unified file server function achieved by having the CPU 31 in the application data virtualization file server 3 execute the unified file server program 23. The unified file server function realizes access request processing by receiving, from the client device 2, a request for data access using a unified access means, converting that request into a request using an access means unique to a lower-level application apparatus 4, and transferring the thus converted request to the application apparatus 4.

The application data virtualization file server 3 receives, from the client device 2, a request for data access using a unified access means (NFS in the example of FIG. 7) (step SP31). The access request format varies depending on the content of the access, and will be explained in the section for explanation of each kind of access content.

The application data virtualization file server 3 refers to the command type of the access request and determines a processing routine to call (step SP32). Command types includes "search," "creation," "write," "read," "deletion," "attribute reference," and "attribute update." The application data virtualization file server 3 calls and executes the processing routine relevant to the command (step SP33~SP39). After processing relevant to the command is finished, the application data virtualization file server 3 finishes the processing for the unified file server function.

FIG. 14 shows a search request 71, which is a request format used when the access request from the client device 2 is a data search request. In the search request 71 shown in FIG. 14, the command type in the search request has been omitted. The search request 71 specifies a search keyword 71A. When refining the search target, an app. 71B to be searched is also specified to narrow down the application apparatuses 4. The application data virtualization file server 3 returns a list of data containing the search keyword to the client device 2. If the app. 71A is specified, only the data in the application apparatus 4 specified by the app. 71A is the search target. The method for refining search target data is not limited to specification of the application apparatuses, but may also be specification of attribute information unique to each application apparatus 4, or other similar methods.

FIG. 15 shows a processing flow in a search processing step SP33. This processing is called as a subroutine for the unified file server function.

The application data virtualization file server 3 checks whether or not the search request 71 specifies the app. 71A (step SP41). If specified (step SP41:YES), the application data virtualization file server 3 proceeds to step SP43. If not (step SP41:NO), the application data virtualization file server 3 proceeds to step SP42.

In step SP42, the application data virtualization file server 3 searches an index of data groups to which a user (client device 2) has a right to access, for a data group that matches the search keyword. Whether or not the user has the access right is checked by referring to the account information column 26D in the data management table 26.

In step SP43, the application data virtualization file server 3 searches an index of data groups in the application apparatus specified by the app. 71A and to which the user has a right to access, for the data group that matches the search keyword. Whether or not the user has access right is checked by referring to the account information column 26D in the data management table 26. Whether or not the data is one in the application apparatus 4 specified by the app. 71A is checked by referring to the IP address 26G and application type 26H in the data management table 26.

The application data virtualization file server 3 reads, from the data management table 26, the virtual identifier 26A of data contained in the matched (found) data group (step SP44). The application data virtualization file server 3 has the search result include the virtual identifier 26A to have the client device 2 specify the virtual identifier 26A in a subsequent data reference or update.

The application data virtualization file server 3 refers to the application LU management table 28 and the data relationship management table 29 and checks whether or not the volume 53 (54) that stores the data is a copy destination volume. If that volume 53 (54) is a copy destination volume, the application data virtualization file server 3 excludes that data from the search result (step SP45). By doing so, the search result list becomes short, and the user can search for necessary data more easily.

Next, the application data virtualization file server 3 rearranges the search result data obtained after execution of step 45 in descending order of the number of copies stored in the number of copies column 26E in the data management table 26, as in the rearrange result 81 shown in FIG. 16 (step SP46).

The application data virtualization file server 3 combines data names and their own virtual identifiers 26A into sets, and returns those sets as a search processing result to the client device 2. After that, the application data virtualization file server 3 terminates the search processing step SP33.

In another possible embodiment of steps SP45 and SP46, like the rearrangement result 82 shown in FIG. 16, the original data may be displayed at the top of the list, followed by the copy data being displayed on a line one level lower than the original data based on the parent-child relationship between data in a copy relationship. By doing so, it becomes easier for the user to visually understand the parent-child relationship of the data.

In another possible embodiment of steps SP45 and SP46, like the rearrangement result 83 shown in FIG. 16, the above mentioned reliability or performance information may also be displayed together with the search processing result or data listing result. By doing so, it becomes easier for the user to visually understand the information about the reliability or performance of the volume 53 (54) that stores the data.

FIG. 17 shows an example of a new data creation request 72, which is a request format used when creating new data. If the new data creation request 72 is issued, new data is created within the application data or in the updated data volume 54. The new data creation request 72 specifies a file name 72A and, if necessary, an app. 72B indicating the application apparatus 4 where the new data is to be created.

FIG. 18 shows the processing flow for the data creation processing step SP 34. This processing is called as a subroutine for the unified file server function.

The application data virtualization file server 3 checks whether or not the new data creation request 72 specifies the app. 72B (step SP51). If the app. 72B is specified (step SP51: YES), the application data virtualization file server 3 proceeds to step SP53. If not (step SP51:NO), the application data virtualization file server 3 proceeds to step SP52.

The application data virtualization file server 3 creates data with the specified file name in the updated data volume 54 (step SP52). A file system or a NAS, or similar, is used as the updated data volume 54 so that data can be written in units of files.

If the app. 72B is specified (step SP51:YES), the application data virtualization file server 3 refers to the updatability status column 27D in the application registration/management table 27 and checks whether or not data in the relevant application apparatus 4 can be updated (step SP53). If the data in the application apparatus 4 cannot be updated (step SP53: NO), the application data virtualization file server 3 cannot create data in the application apparatus 4, and proceeds to step SP52.

If the data in the application apparatus 4 can be updated (step SP53:YES), the application data virtualization file server 3 calls the conversion program 25 specifying the new data creation request 72 to create data using a data creation command for that application apparatus 4. The application data virtualization file server 3 creates data in the application apparatus 4 using, in actuality, in the conversion program 25, the data creation command for the application apparatus 4 (step SP54).

The application data virtualization file server 3 registers the above created data as new data for the data management table 26. When doing so, the application data virtualization file server 3 allocates a new virtual identifier 26A to that data. If necessary, the application data virtualization file server 3 calculates, using the data relationship management table 29, the number of copies of the data.

The application data virtualization file server 3 returns the virtual identifier 26A to the client device 2. That virtual identifier 26A is used when the client device 2 subsequently writes data in the thus created file. After that, the application data virtualization file server 3 terminates the data creation processing step SP34.

FIG. 19 shows an example of a write request 73, which is a request format used when writing data. When a write request is issued, the application data itself is updated when possible. If the application data cannot be updated, the update target data is first copied to the updated data volume 54, and then the thus copied data is updated. The write request 73 specifies a virtual identifier 73A for specifying the target data of the data write processing, the data update position (offset from the head of a file) 73B, the data length 73C of updated data, and the data 73D.

FIG. 20 shows the processing flow for the data write processing step SP35. This processing is called as a subroutine for the unified file server function.

The application data virtualization file server 3 refers to the IP address 26G and the application type 26H in the original storage position column 26B in the data management table 26, and identifies the application apparatus 4 corresponding to the specified virtual identifier 26A (step SP61).

The application data virtualization file server 3 refers to the account information column 26D in the data management table 26 and checks whether or not the client device 2 that issued the write request 73 has the right to access the relevant data (step SP62). If the client device 2 that issued the write request 73 does not have the right to access that data (step SP62:NO), the application data virtualization file server 3 proceeds to step SP63.

Since the client device 2 that issued the write request 73 does not have the right to overwrite the relevant application data, the application data virtualization file server 3 sends an error notice to the client device 2 (step SP63), and terminates the data write processing step SP35.

If the client device 2 that issued the write request 73 has the data access right (step SP62:YES), the application data virtualization file server 3 refers to the updatability status column 27D in the application registration/management table 27 and checks whether or not data in the application apparatus 4 that stores the application apparatus 4 having the specified data can be updated (step SP64). If data in the application apparatus 4 can be updated (step SP64:YES), the application data virtualization file server 3 proceeds to step SP65. If not (step SP64:NO), the application data virtualization file server 3 proceeds to step SP66.

The application data virtualization file server 3 calls the conversion program 25 specifying the write request 73 to update the data using a data write command for that application apparatus 4. The application data virtualization file server 3 updates the data in the application apparatus 4 using, in actuality, in the conversion program 25, the data write command for the application apparatus 4 (step SP65). The application data virtualization file server 3 also converts the format of the updated data into the format for the application apparatus 4, then updates the above-converted updated data of the application data.

If data in the application apparatus 4 cannot be updated (step SP64:NO), the application data virtualization file server 3 refers to the updated data storage position column 26F in the data management table 26 and checks whether or not updated data for that data already exists (step SP66). If the updated data does not exist (step SP66:NO), the application data virtualization file server 3 proceeds to step SP67. If the updated data exists (step SP66:YES), the application data virtualization file server 3 proceeds to step SP69.

To copy the update target data from the application apparatus 4 to the updated data volume 54, the application data virtualization file server 3 calls the conversion program 25 specifying a read request issued based on the write request 73. The application data virtualization file server 3 converts the format of the data read according to that read request into the unified format, and writes the thus format-converted data as new data to the updated data volume 54 (step SP67).

The application data virtualization file server 3 registers information about the data copied to the updated data volume 54 for the updated data storage position column 26F in the data management table 26 (step SP68).

The application data virtualization file server 3 updates the updated data stored in the updated data volume 54 (step SP69).

The application data virtualization file server 3 notifies the client device 2 of the processing completion (step SP70) and terminates the data write step SP35.

Figures 21, 22:
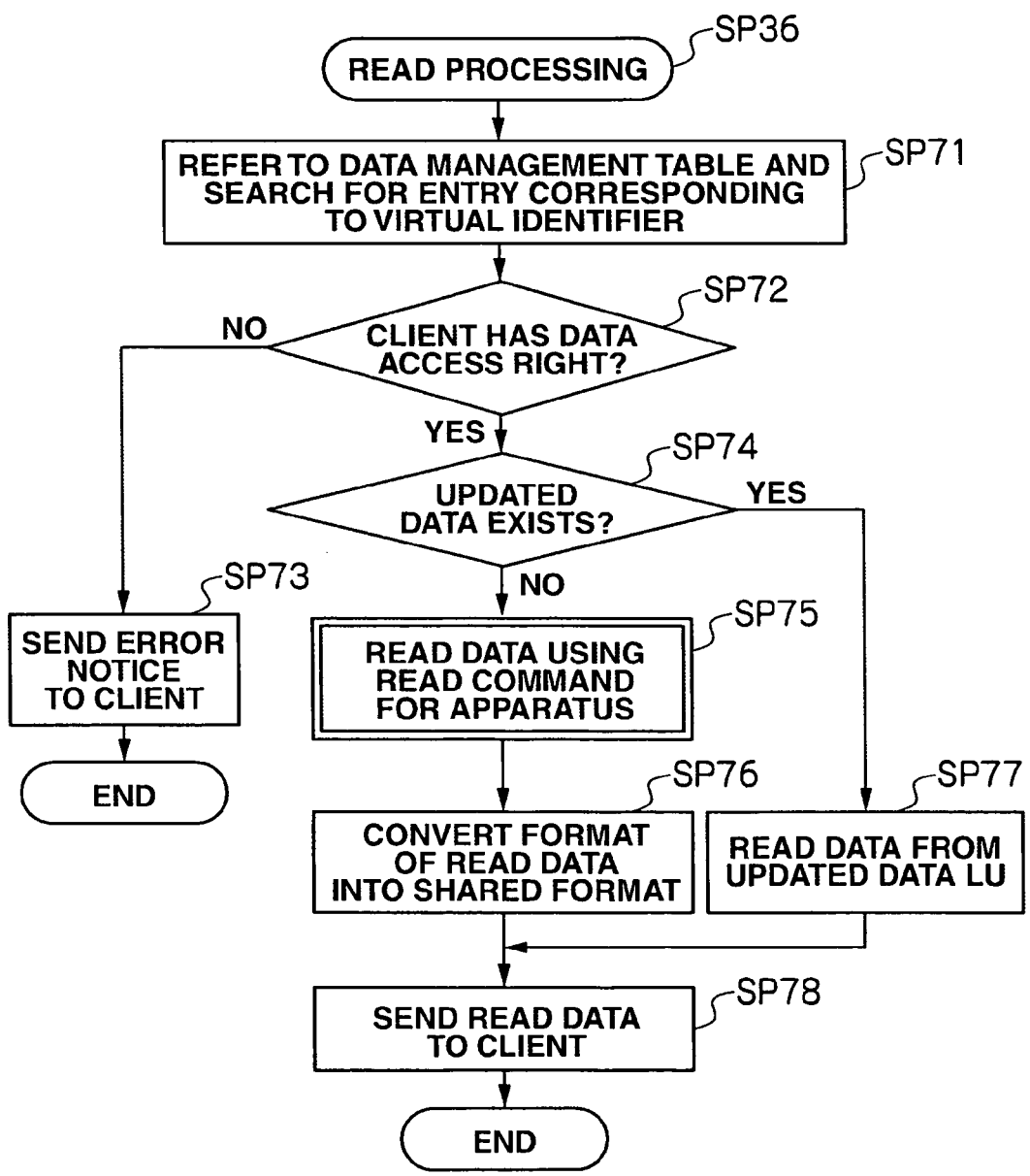
FIG. 21 is a conceptual diagram illustrating a request format for a data read request.
FIG. 22 is a flowchart showing data read processing routine.

FIG. 21 shows an example of a read request 74, which is a request format used when reading data. When a read request is issued, the application data itself is read. However, if the application data in a relevant application apparatus 4 cannot be updated and that data has already been updated, the latest data exists in the updated data volume 54. Therefore, that latest data is read. The read request 74 specifies a virtual identifier 74A for specifying data to be read, a data read position (offset from the head of the file) 74B, and data length 74C of the data to be read.

FIG. 22 shows the processing flow for a data read processing step SP36. This processing is called as a subroutine for the unified file server function.

The application data virtualization file server 3 refers to the IP address 26G and the application type 26H in the original storage position column 26B in the data management table 26, and identifies the application apparatus 4 corresponding to the specified virtual identifier 26A (step SP71).

The application data virtualization file server 3 refers to the account information column 26D in the data management table 26 and checks whether or not the client device 2 that issued the read request 74 has the right to access the relevant data (step SP72). If the client device 2 that issued the read request 74 does not have the right to access that data (step SP72:NO), the application data virtualization file server 3 proceeds to step SP73.

Since the client device 2 that issued the read request 74 does not have the data access right, the application data virtualization file server 3 sends an error notice to the client device 2 (step SP73) and terminates the data read processing step SP36.

If the client device 2 that issued the read request 74 has the data access right (step SP72:YES), the application data virtualization file server 3 refers to the updated data storage position column 26F in the data management table 26 and checks whether or not updated data of the data exists (step SP74). If the updated data does not exist (step SP74:NO), the application data virtualization file server 3 proceeds to step SP75. If the updated data exists (step SP74:YES), the application data virtualization file server 3 proceeds to step SP77.

The application data virtualization file server 3 calls the conversion program 25 specifying the read request 74 to read the data using a data read command for the relevant application apparatus 4. The application data virtualization file server 3 reads the data in the application apparatus 4 using, in actuality, in the conversion program 25, the data read command for the application apparatus 4 (step SP75).

The application data virtualization file server 3 converts the format of the data read from the application apparatus 4 into the unified format (NFS in the example of FIG. 7) (step SP76).

The application data virtualization file server 3 reads the data from the updated data volume 54 (step SP77).

The application data virtualization file server 3 sends the read data to the client device 2 (step SP78), and terminates the data read step SP36.

Figures 23, 24:
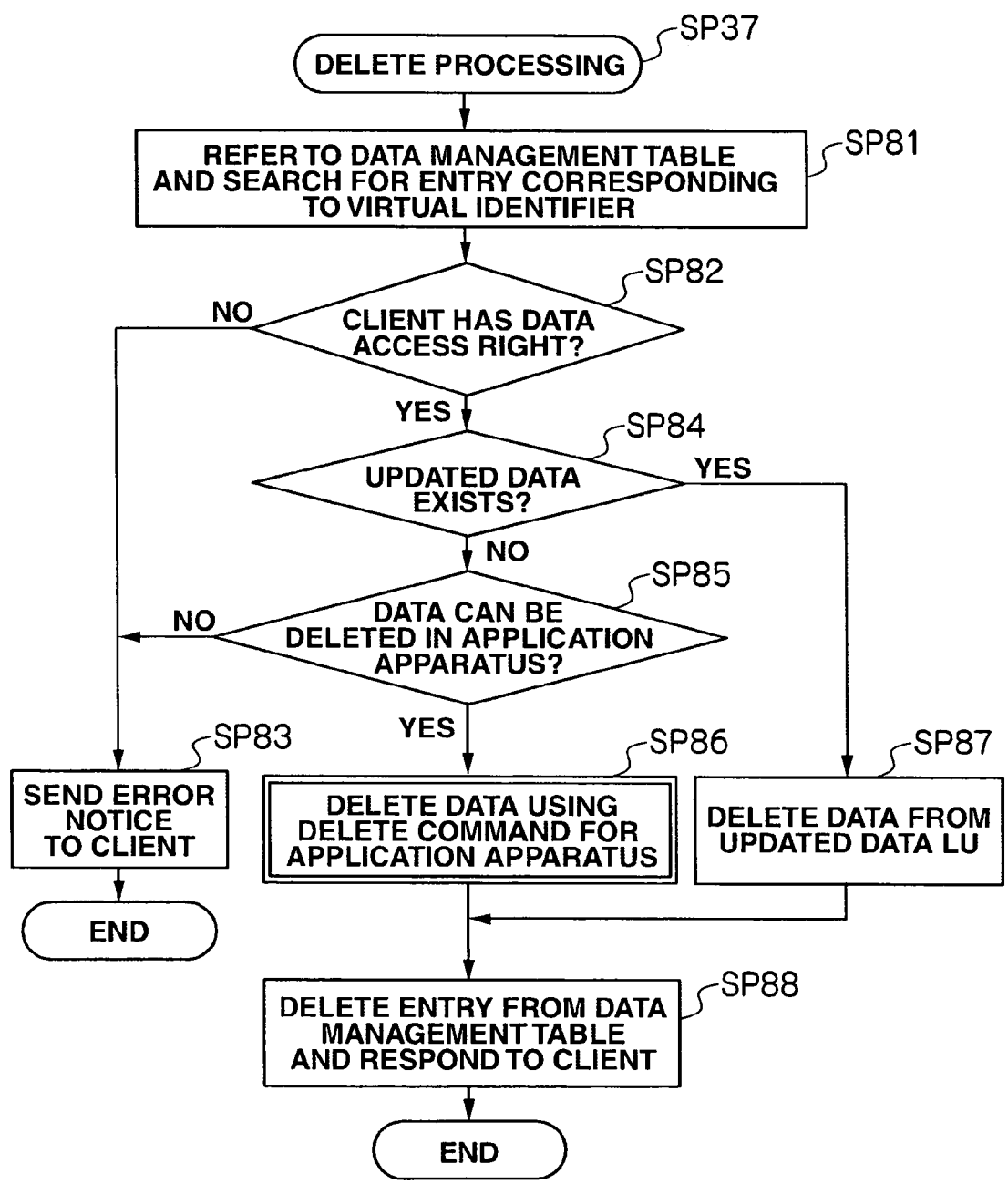
FIG. 23 is a conceptual diagram illustrating a request format for a data delete request.
FIG. 24 is a flowchart showing a data delete processing routine.

FIG. 23 shows an example of a deletion request, which is a request format used when deleting data. When a deletion request is issued, the application data itself is deleted. However, if updated data for the relevant data exists, the updated data is deleted. The deletion request 75 specifies a virtual identifier 75A of the data to be deleted.

FIG. 24 shows the processing flow for deletion step SP37. This processing is called as a subroutine for the unified file server function.

The application data virtualization file server 3 refers to the IP address 26G and the application type 26H stored in the original storage position column 26B in the data management table 26, and identifies the application apparatus 4 corresponding to the specified virtual identifier 26A (step SP81).

The application data virtualization file server 3 refers to the account information column 26D in the data management table 26 and checks whether or not the client device 2 that issued the deletion request 75 has the right to access the relevant data (step SP82). If the client device 2 that issued the deletion request 75 does not have the right to access that data (step SP82:NO), the application data virtualization file server 3 proceeds to step SP83.

Since the client device 2 that issued the deletion request 75 does not have the right to delete the application data, the application data virtualization file server 3 sends an error notice to the client device 2 (step SP83), and terminates the deletion processing step SP37.

If the client device 2 that issued the deletion request 75 has the data access right (step SP82:YES), the application data virtualization file server 3 refers to the updated data storage position column 26F in the data management table 26 and checks whether or not updated data for that data exists (step SP84). If the updated data does not exist (step SP84:NO), the application data virtualization file server 3 proceeds to step SP85. If the updated data exists (step SP84:YES), the application data virtualization file server 3 proceeds to step SP87.

The application data virtualization file server 3 refers to the updatability status column 27D in the application registration/management table 27 and checks whether or not data in the application apparatus 4 can be deleted (updated) (step SP85). If data in the application apparatus 4 be deleted (updated) (step SP85:YES), the application data virtualization file server 3 proceeds to step SP86. If not (step SP85:NO), the application data virtualization file server 3 proceeds to step SP83. In step SP83, data in the application apparatus 4 cannot be deleted, so the application data virtualization file server 3 sends an error notice to the client device 2.

The application data virtualization file server 3 calls the conversion program 25 specifying the deletion request 75 to delete the data using a data deletion command for that application apparatus 4. The application data virtualization file server 3 deletes the data in the application apparatus 4 using, in actuality, in the conversion program 25, the data deletion command for that application apparatus 4 (step SP86).

The application data virtualization file server 3 deletes data from the updated data volume 54 (step SP87).

The application data virtualization file server 3 deletes entries corresponding to the above deleted data from the data management table 26, makes a response to the client device 2 (step SP88), and terminates the deletion processing step SP37.

FIG. 25 shows an example of an attribute reference request 76, which is a request format used when referring to attribute. When an attribute reference request is issued, attribute information about the application data is referred to. However, if updated data for that data exists, attribute information about the updated data is referred to. The attribute reference request 76 specifies a virtual identifier 76A for data with attribute information to be referred to. Examples of the attribute information to be referred to include the file size and the data creation time included in attribute information 61I shown in FIG. 7, or similar.

FIG. 26 shows the processing flow for attribute reference processing step SP38. This processing is called as a subroutine for the unified file server function.

The application data virtualization file server 3 refers to the IP address 26G and the application type 26H in the original storage position column 26B in the data management table 26, and identifies the application apparatus 4 corresponding to the specified virtual identifier 26A (step SP91).

The application data virtualization file server 3 refers to the account information column 26D in the data management table 26 and checks whether or not the client device 2 that issued the attribute reference request 76 has the right to access the relevant data (step SP92). If the client device 2 that issued the attribute reference request 76 does not have the right to access that data (step SP92:NO), the application data virtualization file server 3 proceeds to step SP93.

Since the client device 2 that issued the attribute reference request 76 does not have the right to refer to the application data attribute, the application data virtualization file server 3 sends an error notice to the client device 2 (step SP93) and terminates the attribute reference processing step SP38.

If the client device 2 that issued the attribute reference request 76 has the data access right (step SP92:YES), the application data virtualization file server 3 refers to the updated data storage position column 26F in the data management table 26 and checks whether or not updated data for that data exists (step SP94). If the updated data does not exists (step SP94:NO), the application data virtualization file server 3 proceeds to step SP95. If the updated data exists (step SP94:YES), the application data virtualization file server 3 proceeds to step SP97.

The application data virtualization file server 3 calls the conversion program 25 specifying the read request 74 to read the data using a data read command for the relevant application apparatus 4.

The application data virtualization file server 3 reads the data in the application apparatus 4 using, in actuality, in the conversion program 25, the data read command for the application apparatus 4 (step SP75).

The application data virtualization file server 3 calls the conversion program 25 specifying the attribute reference request to refer to data attribute information using an attribute reference command for the relevant application apparatus 4. The application data virtualization file server 3 reads the attribute information about the data in the application apparatus 4 using, in actuality, in the conversion program 25, the attribute reference command for that application apparatus 4 (step SP95).

The application data virtualization file server 3 converts the format of the attribute information about the data read from the application apparatus 4 into the unified format (NFS in the example of FIG. 7) (step SP96).

The application data virtualization file server 3 reads the data attribute information from the updated data volume 54 (step SP97).

The application data virtualization file server 3 sends the above read data attribute information to the client device 2 (step SP98), and terminates the attribute reference processing step SP38.

FIG. 27 shows an example of an attribute update request 77, which is a request format used when updating data attribute. When an attribute update request is issued, attribute information of application data itself is updated if the attribute information can be updated. If not, the target data is first copied to the updated data volume 54 and updates attribute information about the thus copied data. The attribute update request 77 specifies a virtual identifier 77A for specifying data and attribute information 77B. Examples of the attribute information to be updated include tag information or other arbitrary attribute information included in the attribute information 61I shown in FIG. 7.

FIG. 28 shows the processing flow for an attribute update processing step SP39. This processing is called as a subroutine for the unified file server function.

The application data virtualization file server 3 refers to the IP address 26G and the application type 26H in the original storage position column 26B in the data management table 26, and identifies the application apparatus 4 corresponding to the specified virtual identifier 26A (step SP101).

The application data virtualization file server 3 refers to the account information column 26D in the data management table 26 and checks whether or not the client device 2 that issued the attribute update request 77 has the right to access the relevant data (step SP102). If the client device 2 that issued the attribute update request 77 does not have the right to access that data (step SP102:NO), the application data virtualization file server 3 proceeds to step SP63.

Since the client device 2 that issued the attribute update request 77 does not have the attribute update right for the application data, the application data virtualization file server 3 sends an error notice to the client device 2 (step SP103), and terminates the attribute update processing step SP39.

If the client device 2 that issued the attribute update request 77 has the data access right (step SP102:YES), the application data virtualization file server 3 refers to the updatability status column 27D in the application registration/management table 27 and checks whether or not data in the specified application apparatus 4 data can be updated (step SP104). If data in the application apparatus 4 can be updated (step SP104:YES), the application data virtualization file server 3 proceeds to step SP105. If not (step SP104:NO), the application data virtualization file server 3 proceeds to step SP107.

The application data virtualization file server 3 converts the format of the attribute information specified by the client device 2 into the attribute information format unique to the application apparatus (step SP104).

The application data virtualization file server 3 calls the conversion program 25 specifying the attribute update request 77 to update the attribute information using the attribute update command for that application apparatus 4. The application data virtualization file server 3 updates the attribute information about the application data using, in actuality, in the conversion program 25, the attribute update command for the application apparatus 4 (step SP106).

If data in the application apparatus 4 cannot be updated (step SP104:NO), the application data virtualization file server 3 refers to the updated data storage position column 26F in the data management table 26 and checks whether or not updated data of the relevant data already exists (step SP107). If the updated data does not exist (step SP107:NO), the application data virtualization file server 3 proceeds to step SP108. If the updated data exists (step SP107:YES), the application data virtualization file server 3 proceeds to step SP110.

The application data virtualization file server 3 calls the conversion program 25 specifying a read request created according to the attribute update request 77 to copy the attribute update target data from the application apparatus 4 to the updated data volume 54. The application data virtualization file server 3 converts the format of the data read according to the above read request into the unified format, and writes the thus converted data as new data to the updated data volume 54 (step SP108).

The application data virtualization file server 3 registers the information about the data copied to the updated data volume 54 for the updated data storage position column 26F in the data management table 26 (step SP109).

The application data virtualization file server 3 updates, with the attribute information specified by the client device 2, the attribute information about the updated data stored in the updated data volume 54 (step SP110).

The application data virtualization file server 3 notifies the client device 2 of processing completion (step SP111), and terminates the attribute update processing step SP39.

By executing the above described processing steps, in the application data virtualization file system 1, the application data virtualization file server 3 uses the conversion program 25 for converting between a unified access means (NFS in the example in FIG. 7) and an access means for each application apparatus 4 (IMAP4 in the example in FIG. 7) to execute the data discovery processing on the application apparatuses 4 corresponding to all IP addresses 27 registered in the application registration/management table 27. After that, the application data virtualization file server 3 creates the data management table 26 where all data are identified by the virtual identifiers.

The application data virtualization file server 3 processes access requests by internally converting, using the conversion program 25, an access request from a client device 2 into an access request dedicated to each application apparatus 4. If the access request is a request for data update but the relevant application data cannot be updated, the application data virtualization file server 3 first stores that application data in the updated data volume 54 and updates the application data stored above in the updated data volume 54. When doing so, the application data virtualization file server 3 manages, using data management table 26, the location where the updated data exists.

With that configuration, in the application data virtualization file system 1, the client device 2 can access all data in various application apparatuses 4 using the unified access means provided by the application data virtualization file server 3, and a user of the client device 2 can access data in plural application apparatuses 4 using the unified access method while the user does not have to consider the difference in data access means among the application apparatuses 4. Accordingly, data utilization improves.

In addition, during data discovery, the application data virtualization file server 3 acquires, using the storage control program 24 or other relevant programs, data-related information from the storage apparatus 5. The application data virtualization file server 3 registers the thus acquired information for the data relationship management table 29, calculates a score for each data in the data management table 26 to determine the order for search results, and registers the calculation result for the data management table 26. Data that has been copied a larger number of times is possibly more important data, and accordingly, processing for rearranging the search results is executed by calculating the number of times of copy.

With that configuration of the application data virtualization file system 1, by filtering, during data search, the search results based on a copy relationship between data or the reliability of the storage apparatus 5 where the relevant data is stored, it becomes easier for a client device user to find necessary data.

2. Second Embodiment

Figure 29:
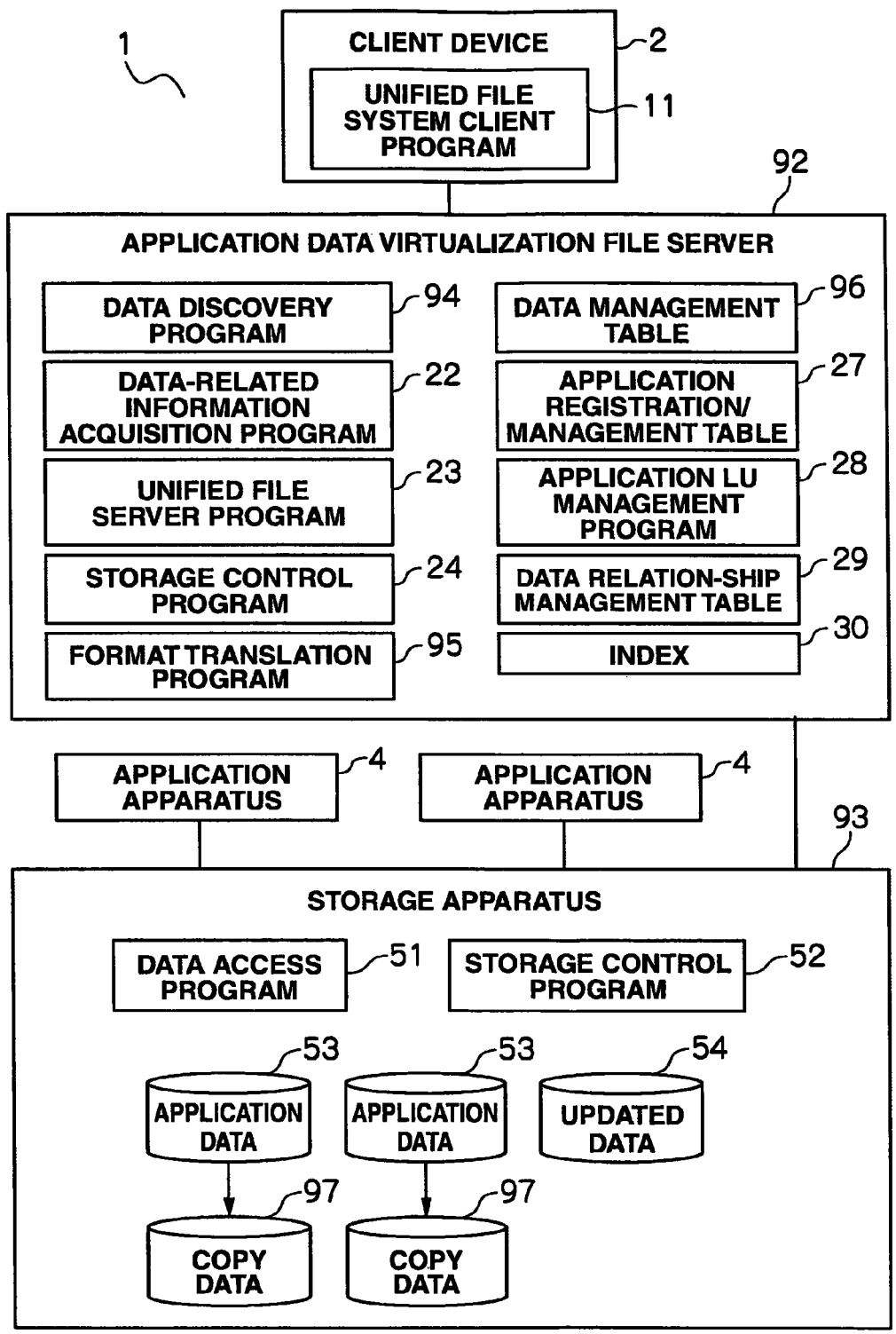
FIG. 29 is a block diagram showing a schematic configuration for an application data virtualization system in a second embodiment.

FIG. 29 illustrates an embodiment other than the embodiment shown in FIG. 1.

The application data virtualization system 91 includes a client device 2, an application data virtualization file server 92, application apparatuses 4, and a storage apparatus 93.

The application data virtualization file server 92 differs from the application data virtualization file server 3 shown in FIG. 1 on the point that data access is not directly performed with the application apparatuses 4. In this embodiment, data access is not performed via the application apparatuses 4, but application data is first copied to the storage apparatus 93, and the thus copied data is the virtualization target.

The application data virtualization file server 92 has the same programs as those used in the first embodiment, except that a data discovery program 94 is used instead of the data discovery program 21, and that a format translation program 95 is used instead of the conversion program 25. When performing the functions based on each program, the embodiment shown in FIG. 1 accesses data via the application apparatuses 4. Meanwhile, in the embodiment shown in FIG. 29, the application data virtualization file server 92 accesses the above mentioned copied data. Those differences will be described later.

Regarding the data managed by the application data virtualization file server 92, the configuration of the data management table 96 partially differs from the configuration of the data management table 26. More specifically, as shown in FIG. 30, to determine an original storage position 96A of application data in the data management table 96, the data management table 96 does not contain the IP address 26G of the application apparatus 4, but a copy LU 96B for specifying an LUN of the volume 97 that stores the copy data of the application data.

The storage apparatus 93 has volumes 97 for storing copy data of the application data.

Figure 31:
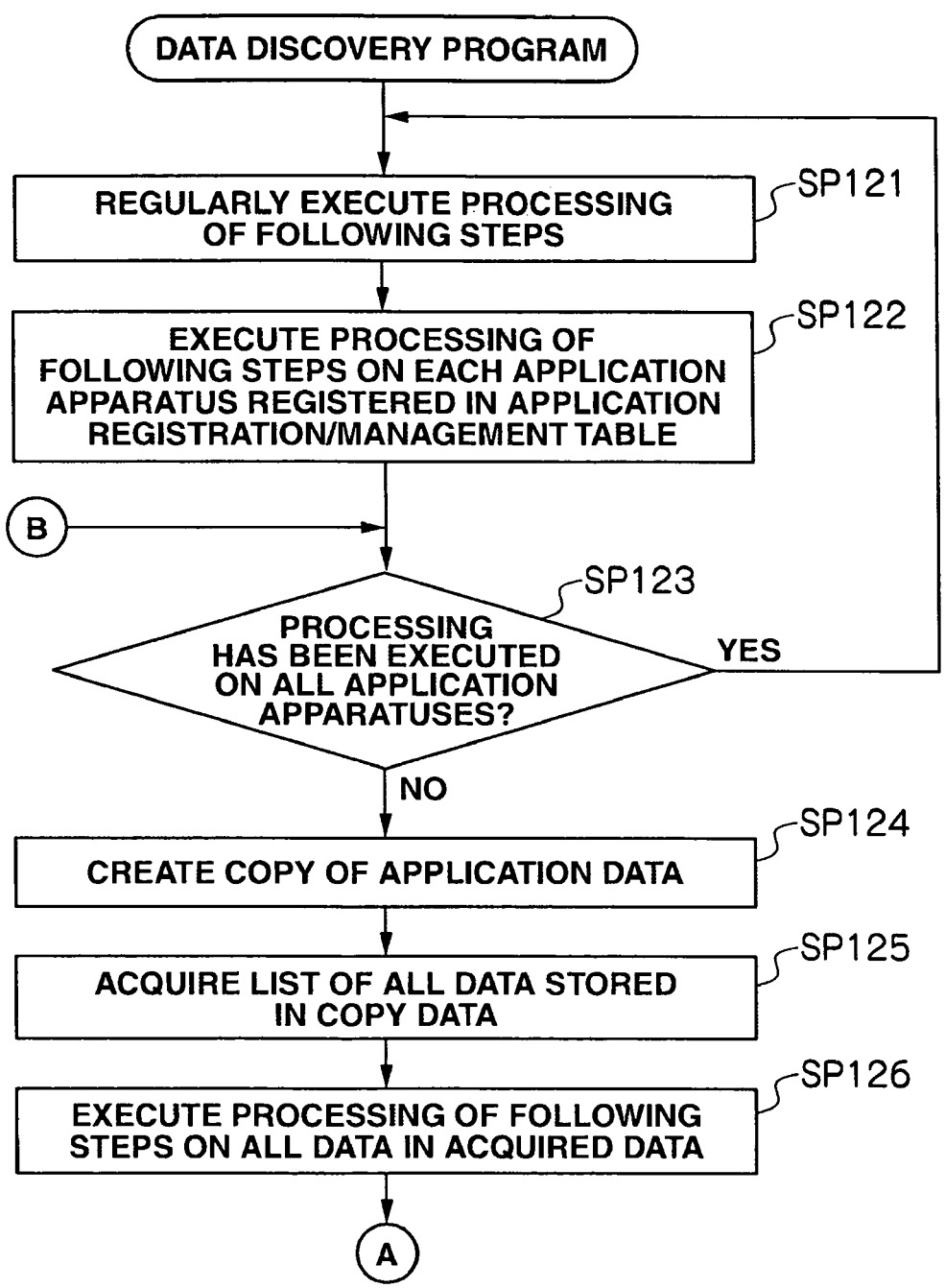
FIG. 31 is a flowchart showing a processing routine for a data discovery function in the second embodiment.

FIG. 31 shows a processing flow for a data discovery function achieved by having the CPU31 in the application data virtualization file server 92 execute the data discovery program 94. In this embodiment, the copy data of the application data is the data discovery target. Since the original application data is updated even while copy data is being used, the data management table 96 is maintained at the latest status by regularly creating copy data.

The application data virtualization file server 92 executes the following processing regularly, e.g., once a day (step SP121).

The application data virtualization file server 92 executes processing of step SP123 and subsequent steps on the application apparatus 4 corresponding to each IP address 27A registered in the application registration/management table 27 (step SP122).

The application data virtualization file server 92 checks whether or not the above processing has been executed on all entries in the application registration/management table 27 (step SP123). If the processing has been executed on all entries in the application registration/management table 27 (step SP123:YES), the application data virtualization file server 3 returns to step SP121.

If the processing has not been executed on all entries (step SP123:NO), the application data virtualization file server 92 creates, using the storage control program 24, copy data of the application data (step SP124).

The application data virtualization file server 92 acquires a list of all data stored in the volumes 97 for storing copy data (step SP125). It is assumed that in step SP125 the application data virtualization file server 3 can analyze the storage format of the application data by executing the format translation program 95. Application data can be read/written not via the application apparatuses 4 by utilizing the conventional techniques.

The application data virtualization file server 92 executes processing of step SP8 and subsequent steps on the above acquired data. When referring to data, the data is directly read by analyzing the storage format of the application data. The processing of step SP8 and subsequent steps is the same as that in the first embodiment.

The steps shown with double-lined frames in the flowcharts shown in the FIGS. 10, 18, 20, 22, 24, 26, and 28 in the first embodiment differ from the second embodiment. The difference lies in whether data or data attribute information is accessed via the relevant application apparatus 4, or accessed by analyzing copy data not via the application apparatuses 4.

For example, regarding data read processing, step SP75 in FIG. 22 is different. In the first embodiment, data is read via the relevant application device 4 using a data read command for the application apparatus 4. Meanwhile, in the second embodiment, data is read by analyzing copy data. Also, in the first embodiment, the unified access means is converted, using the conversion program 25, into an access means unique to each application apparatus 4. Meanwhile, in the second embodiment, the format of copy data stored in the volume 97 is analyzed using the format translation program 95, and an access means (format) unique to each application apparatus 4 is converted into a unified access means (shared format) for directly accessing copy data of data in the application apparatus 4.

With that configuration, even if copy data has been modified, the application data virtualization system 91 can prevent loss of the pre-modification content in step SP124 by acquiring in advance the copy data of application data for several generations. When doing so, the application data virtualization system 91 registers, as new data, for the data management table 96, the above created new copy data with the content different from the content of the old copy data.

In addition, in the application data virtualization system 91, the application data virtualization file server 92 does not access data via any application apparatus 4, but first copies application data within the storage apparatus 93 and the thus copied data is the virtualization target.

With that configuration, in the application data virtualization system 91, data access takes place to the volumes 97. Accordingly, it is possible to effectively prevent data in the application apparatuses 4 from being processed by any chance. In addition, because no access is made to the volume 53, the performance of the application apparatuses 4 is improved for a user or client device that directly uses the application apparatuses 4.

The invention can be used in systems where various application apparatuses operate, systems that provide a client device with a unified means for accessing data in all application apparatuses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An information processing system comprising:
a first application apparatus for managing, a first data item recorded in a predetermined format and stored in a storage apparatus coupled to the first application apparatus;
a second application apparatus for managing, a second data item, which is different from the first data item, recorded in a format other than the format of the first data item and stored in the storage apparatus;
a server device for managing the first application apparatus and the second application apparatus by a list of application apparatus, for accessing the first data item and the second data item via the first application apparatus and the second application apparatus, and for managing access to the first data item and the second data item in a unified access format; and
a client device for accessing the server device and using the first data item and the second data item provided in the unified access format by the server device,
wherein the server device
allocates a unique identifier to each of the first data item and the second data item,
manages, using data management information, a correspondence between each identifier and each access method for accessing the first data item and the second data item identified by that identifier, an original storage location of the first data item and the second data item, and an updated data storage location of the first data item and the second data item,
wherein the server device converts unique data information relating to each of the first data item and the second data item to the unified access format, and unique command information relating to each of the first data item and the second data item to the unified access format, wherein when the server device receives a read request specified by the unique identifier of the first data item from the client device, the server device specifies the first data item by the unique identifier based on the data management information, reads the first data item stored in the storage apparatus via the first application apparatus by using a unique command for read data corresponding to the first application apparatus, converts the first data item read from the storage apparatus to the unified access format, and sends the converted first data item to the client device.

2. The information processing system according to claim 1, wherein the server device includes a data write unit for writing, when receiving, from the client device, an identifier-specifying update request for update of the first data item or the second data item, updated data of the first data item or the second data item to a second volume for storing updated data,
wherein the management unit manages, after the updated data is written by the data write unit, the correspondence between the identifier and the updated data so that access to the updated data is requested, and
wherein the information processing system includes a data access unit that requests, when receiving a request for access to the first data item or the second data item corresponding to the updated data, access to the updated data of the first data item or the second data item using the access method converted to by the conversion unit.

3. The information processing system according to claim 2, wherein the data write unit writes, if data in the first application apparatus or the second application apparatus that manages the first data item or the second data item cannot be updated, updated data of the first data or the second data to the second volume for storing updated data.

4. The information processing system according to claim 1, wherein the management unit manages, when receiving a request for creation of the first data item or the second data item, a correspondence between the first data item or the second data item and the identifier, and
wherein the data access unit requests creation of the first data item or the second data item using the access method converted to by the conversion unit, and sends, to the client device, a data creation result and the identifier corresponding to the thus created first data item or second data item.

5. A data access method for an information processing system, wherein the information processing system includes
a first application apparatus for managing a first data item recorded in a predetermined format and stored in a storage apparatus coupled to the first application apparatus,
a second application apparatus for managing a second data item, which is different from the first data item, recorded in a format other than the format of the first data and stored in the storage apparatus,
a server device for managing the first application apparatus and the second application apparatus by a list of application apparatus, for accessing the first data item and the second data item via the first application apparatus and the second application apparatus, and for managing access to the first data item and the second data item in a unified access format, and
a client device for accessing the server device and using the first data item and the second data item provided in the unified access format by the server device,
the method comprising:
allocating, under the control of an allocation unit in the server device, a unique identifier to each of the first data item and the second data item; and
managing, under the control of a management unit in the server device, a correspondence between each identifier and each access method for accessing the first data item and the second data item identified by that identifier, an original storage location of the first data item and the second data item, and an updated data storage location of the first data item and second data item, wherein the managing is performed using data management information;
the server device converting unique data information relating to each of the first data item and the second data item to the unified access format, and converting unique command information relating to each of the first data item and the second data item to the unified access format;
the server device receiving a read request specified by the unique identifier of the first data item from the client;
the server device specifying the first data item by the unique identifier based on the data management information;
the server device reading the first data item stored in the storage apparatus via the first application apparatus by using unique command for read data corresponding to the first application apparatus;
the server device converting the first data item read from the storage apparatus to the unified access format; and
the server device sending the converted first data item to the client device.

6. The data access method according to claim 5, further comprising:
a data writing step of writing, under the control of a data write unit in the server device, after receiving from the client device an identifier-specifying update request for update of the first data item or the second data item, updated data of the first data or the second data to a second volume for storing updated data;
managing a correspondence between the identifier and the updated data after the updated data is written in the data writing step.

7. The data access method according to claim 6, wherein in the data writing step, if data in the first application apparatus or the second application apparatus that manages the first data or the second data cannot be updated, updated data of the first data item or second data item is written to the second volume for storing updated data.

8. The data access method according to claim 5, further comprising:
receiving a request for creation of the first data item or the second data item and managing a correspondence between the received first data item or second data item and the identifier.

9. An information processing system comprising:
a first application apparatus for managing a first data item recorded in a predetermined format and stored in a storage apparatus coupled to the first application apparatus;
a second application apparatus for managing a second data item, which is different from the first data item, recorded in a format other than the format of the first data and stored in the storage apparatus;
a server device for managing the first application apparatus and the second application apparatus by a list of application apparatus, for accessing the first data item and the second data item via the first application and the second application apparatus, and for managing access to the first data item and the second data item in a shared access format; and a client device for accessing the server device and using the first data item and the second data item provided in the shared access format by the server device, wherein the server device includes a copy data creation unit for creating copy data of the first data item and the second data item;

wherein the server device allocates a unique identifier to each of the copy data of the first data item and the second data item, manages, using data management information, a correspondence between each identifier and each access method for the first data item and the second data item identified by the identifier, an original storage location of the first data item and the second data item, an updated data storage location of the first data item and the second data item, wherein the server device includes a conversion unit for reading, when receiving from the client device an identifier-specifying request for reference to the first data item or the second data item, the copy data of the first data item or the second data item corresponding to the specified identifier from the storage apparatus, and converting the format of the copy data of the first data item or the second data item into a shared format associated with the identifier;

wherein the server device includes a data transmission unit for sending, to the client device, the copy data of the first data item or the second data item having the format converted, by the conversion unit, into the shared format.

10. The information processing apparatus according to claim 9, wherein the server device includes a data write unit for writing, when receiving from the client device an identifier-specifying update request for update of the copy data of the first data item or the second data item, updated data of the copy data of the first data item or the second data item to a second volume for storing updated data, and wherein the conversion unit converts the format of the updated data into the format of the copy data of the first data item or second data item.

11. The information processing apparatus according to claim 9, wherein the copy data creation unit regularly updates the copy data of the first data item and the second data item, and wherein a management unit regularly updates a correspondence between the identifier and a method for converting, into a shared format, the format of the copy data of the first data item or the second data item identified by the identifier.

* * * * *